(12) United States Patent
Yigzaw et al.

(10) Patent No.: US 10,324,852 B2
(45) Date of Patent: Jun. 18, 2019

(54) SYSTEM AND METHOD TO INCREASE AVAILABILITY IN A MULTI-LEVEL MEMORY CONFIGURATION

(71) Applicant: INTEL CORPORATION, Santa Clara, CA (US)

(72) Inventors: Theodros Yigzaw, Sherwood, OR (US); Ashok Raj, Portland, OR (US); Robert C. Swanson, Olympia, WA (US); Mohan J. Kumar, Aloha, OR (US)

(73) Assignee: INTEL CORPORATION, Santa Clara, CA (US)

(*) Notice: Subject to any disclaimer, the term of this patent is extended or adjusted under 35 U.S.C. 154(b) by 106 days.

(21) Appl. No.: 15/374,796

(22) Filed: Dec. 9, 2016

(65) Prior Publication Data

US 2018/0165207 A1 Jun. 14, 2018

(51) Int. Cl.
*G06F 11/00* (2006.01)
*G06F 12/0868* (2016.01)
*G06F 11/20* (2006.01)
*G06F 12/109* (2016.01)

(52) U.S. Cl.
CPC ...... *G06F 12/0868* (2013.01); *G06F 11/2094* (2013.01); *G06F 12/109* (2013.01); *G06F 2201/805* (2013.01); *G06F 2201/82* (2013.01); *G06F 2212/1032* (2013.01); *G06F 2212/2022* (2013.01); *G06F 2212/222* (2013.01)

(58) Field of Classification Search
CPC .... G06F 11/00; G06F 11/073; G06F 11/0793; G06F 11/1435; G06F 12/0868; G06F 3/0653; G11C 29/76
See application file for complete search history.

(56) References Cited

U.S. PATENT DOCUMENTS

| | | | | |
|---|---|---|---|---|
| 5,561,795 A | * | 10/1996 | Sarkar | G06F 11/1471 |
| 5,634,046 A | * | 5/1997 | Chatterjee | G06F 9/3004 |
| | | | | 712/202 |
| 5,829,017 A | * | 10/1998 | Ohtsuka | G06F 3/0607 |
| | | | | 711/113 |
| 7,480,816 B1 | * | 1/2009 | Mortazavi | G06F 11/1482 |
| | | | | 714/10 |
| 9,477,548 B2 | * | 10/2016 | Hoekstra | G06F 11/1048 |
| 9,842,038 B2 | * | 12/2017 | Zhang | G06F 11/273 |
| 9,940,040 B2 | * | 4/2018 | Schnarch | G06F 3/0619 |

(Continued)

*Primary Examiner* — Loan L. T. Truong
(74) *Attorney, Agent, or Firm* — Womble Bond Dickinson (US) LLP

(57) ABSTRACT

One embodiment provides for a data processing system comprising a multi-level system memory including a first memory level of volatile memory and a second memory level that is larger and slower in comparison with the first memory level. The second memory level includes non-volatile memory and can additionally include volatile memory. The multi-level system memory includes a multi-level memory controller including logic to manage a list of faulty addresses within the multi-level system memory. The multi-level memory controller can manage a list of faulty addresses. The multi-level memory controller is configured to satisfy a request for data stored in the first memory level from the second memory level when the data is stored in an address on the list of faulty addresses.

19 Claims, 27 Drawing Sheets

(56) References Cited

U.S. PATENT DOCUMENTS

| | | | |
|---|---|---|---|
| 2005/0268028 A1* | 12/2005 | Mukherjee | G11C 15/00 711/108 |
| 2006/0085700 A1* | 4/2006 | Fong | G11C 15/00 714/710 |
| 2009/0031082 A1* | 1/2009 | Ford | G06F 12/0864 711/128 |
| 2011/0289349 A1* | 11/2011 | Loeser | G06F 11/10 714/6.24 |
| 2012/0079314 A1* | 3/2012 | Kamath | G06F 11/073 714/6.1 |
| 2013/0019128 A1* | 1/2013 | Yamasaki | G06F 11/0733 714/45 |
| 2013/0179640 A1* | 7/2013 | Aggarwal | G06F 12/0864 711/136 |
| 2014/0013074 A1* | 1/2014 | Koka | G06F 12/1045 711/207 |
| 2014/0195730 A1* | 7/2014 | Feekes | G11C 11/40607 711/105 |
| 2014/0215129 A1* | 7/2014 | Kuzmin | G06F 12/0246 711/103 |
| 2014/0325145 A1* | 10/2014 | Sampathkumar | G06F 12/0868 711/114 |
| 2015/0255176 A1* | 9/2015 | Hyder | G11C 29/4401 714/723 |
| 2016/0092302 A1* | 3/2016 | Agarwal | G06F 11/1068 714/773 |
| 2016/0306556 A1* | 10/2016 | Camp | G06F 12/0246 |

* cited by examiner

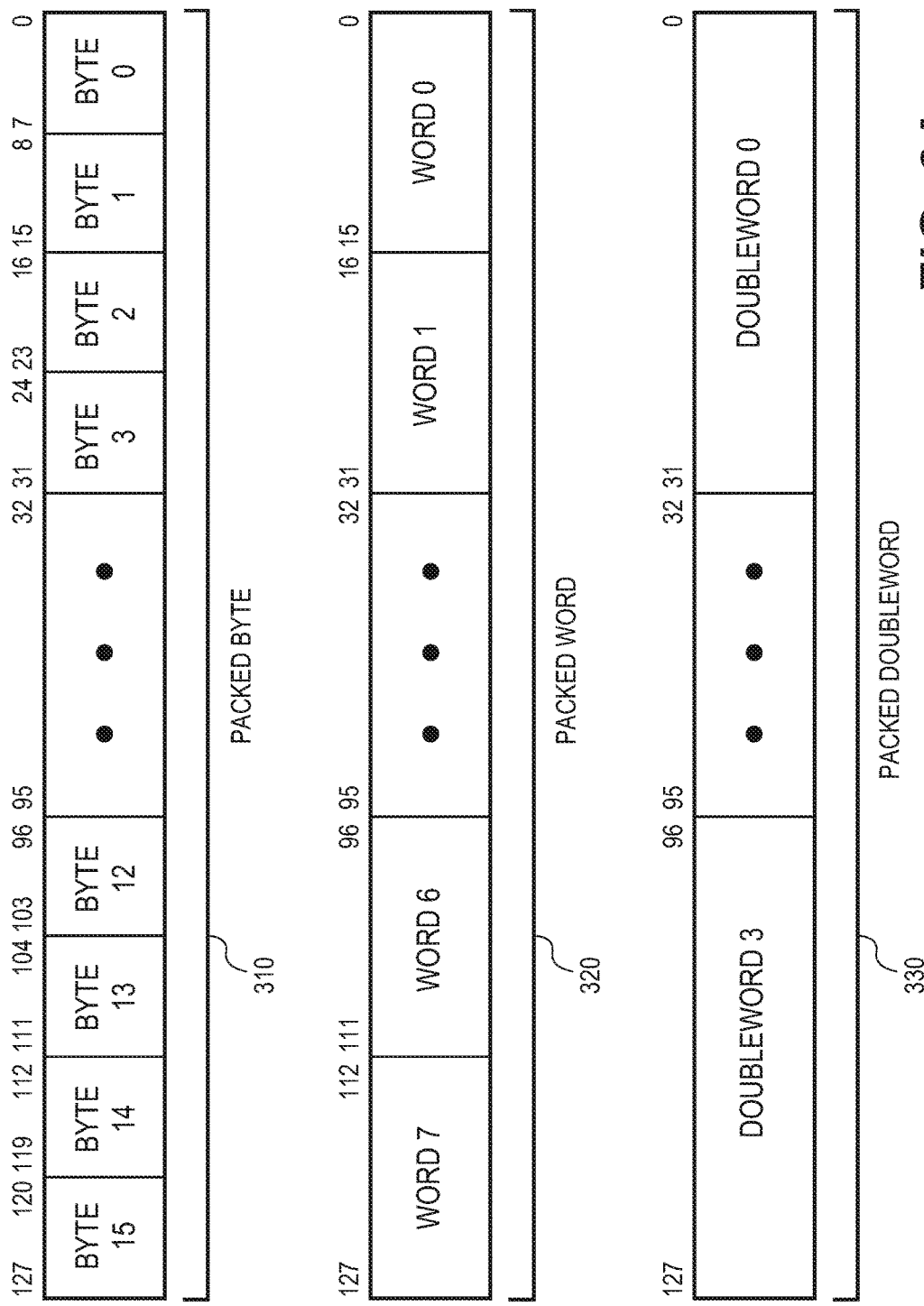

```
 127      120 119    112 111    104 103              24 23    16 15     8 7       0
| bbbb bbbb | bbbb bbbb | bbbb bbbb |  •    •    •  | bbbb bbbb | bbbb bbbb | bbbb bbbb |
```
UNSIGNED PACKED BYTE REPRESENTATION 344

```
 127      120 119    112 111    104 103              24 23    16 15     8 7       0
| sbbb bbbb | sbbb bbbb | sbbb bbbb |  •    •    •  | sbbb bbbb | sbbb bbbb | sbbb bbbb |
```
SIGNED PACKED BYTE REPRESENTATION 345

```
 127                 112 111                                   16 15               0
| wwww wwww wwww wwww |          •    •    •          | wwww wwww wwww wwww |
```
UNSIGNED PACKED WORD REPRESENTATION 346

```
 127                 112 111                                   16 15               0
| swww wwww wwww wwww |          •    •    •          | swww wwww wwww wwww |
```
SIGNED PACKED WORD REPRESENTATION 347

```
 127                              92 91    32 31                                   0
| dddd dddd dddd dddd dddd dddd dddd dddd | • • • | dddd dddd dddd dddd dddd dddd dddd dddd |
```
UNSIGNED PACKED DOUBLEWORD REPRESENTATION 348

```
 127                              92 91    32 31                                   0
| sddd dddd dddd dddd dddd dddd dddd dddd | • • • | sddd dddd dddd dddd dddd dddd dddd dddd |
```
SIGNED PACKED DOUBLEWORD REPRESENTATION 349

FIG. 3C

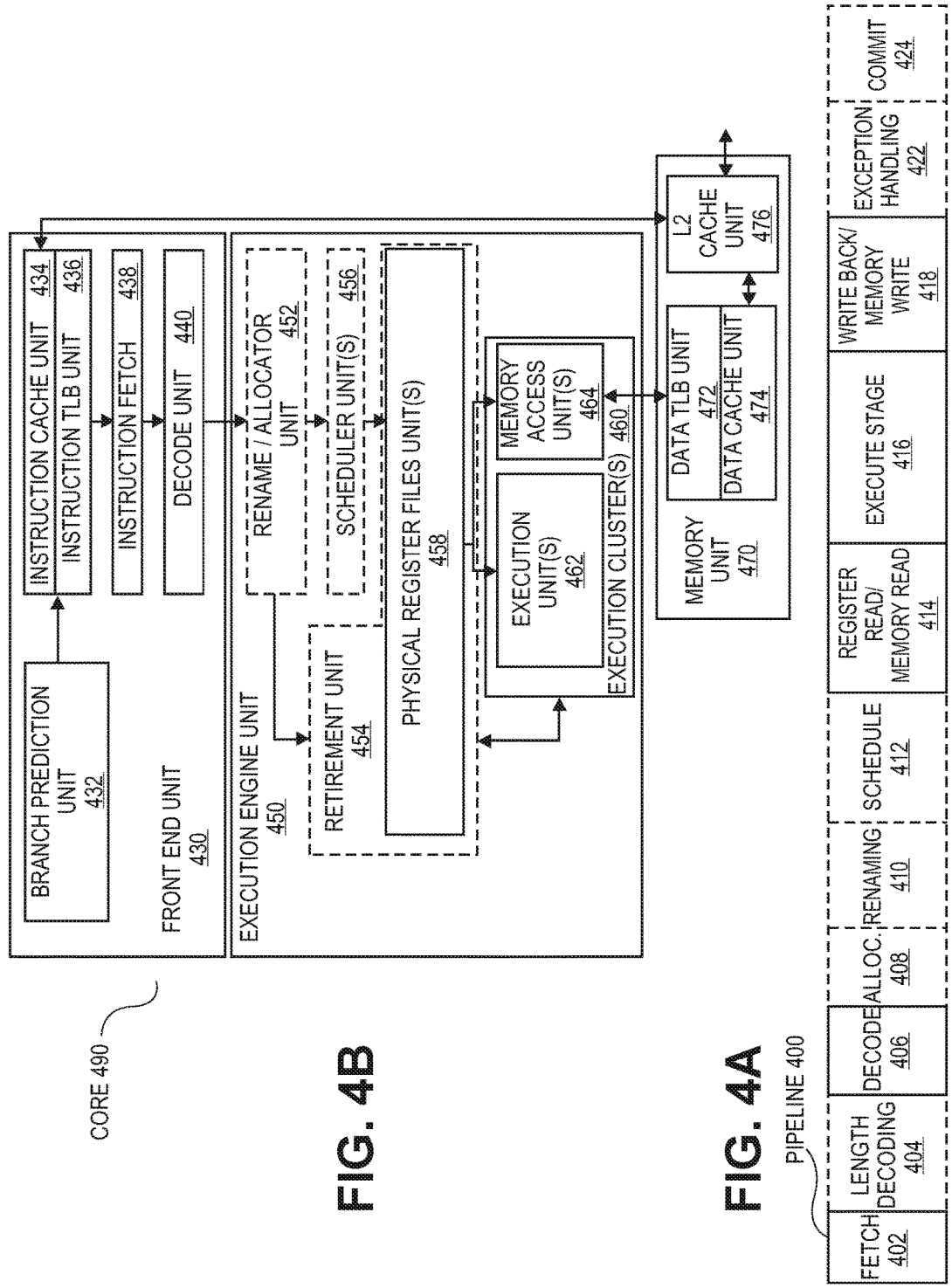

SYSTEM AND METHOD TO INCREASE AVAILABILITY IN A MULTI-LEVEL MEMORY CONFIGURATION

FIELD OF THE INVENTION

The present disclosure pertains to the field of processing logic, microprocessors, and associated memory systems. In particular, embodiments are related to increasing availability in a multi-level main memory system.

DESCRIPTION OF RELATED ART

In main memory systems, dynamic random access memory (DRAM) is generally used to store a subset of the contents of nonvolatile disk storage within a system, as DRAM memory has lower latency and increased bandwidth relative to standard non-volatile storage system. While DRAM memory systems provide sufficient performance to enable storage of instructions and data of currently executing program logic in a computing system, the higher initial and operational cost relative to nonvolatile memory storage limit the use of DRAM as primary system storage. Moreover, DRAM has form factor limitations that can prevent the use of large banks of DRAM memory in certain form factors, such as mobile devices. Moreover, the use of large banks of DRAM in data center applications can be prohibitively expensive from a cost and power perspective.

Multi-level or multi-tiered memory systems can be implemented in data processing systems to balance performance, capacity, power and cost of memory and storage systems. In a multi-level main memory system, high performance volatile memory can be used as a cache for slower but higher capacity non-volatile memory. In such system, a memory controller can be configured to manage access to the multi-level main memory system, such that the underlying architecture of the multi-level main memory system is hidden behind an abstraction layer. From the perspective of system processors and applications executing on those processors, a single level of memory is presented.

DESCRIPTION OF THE FIGURES

Embodiments are illustrated by way of example and not limitation in the Figures of the accompanying drawings:

FIG. 3A illustrates packed data types according to one embodiment;

FIG. 3C illustrates packed data types according to one embodiment;

FIG. 4A illustrates elements of a processor micro-architecture according to one embodiment;

FIG. 4B illustrates elements of a processor micro-architecture according to one embodiment;

DETAILED DESCRIPTION

Figure 1A:
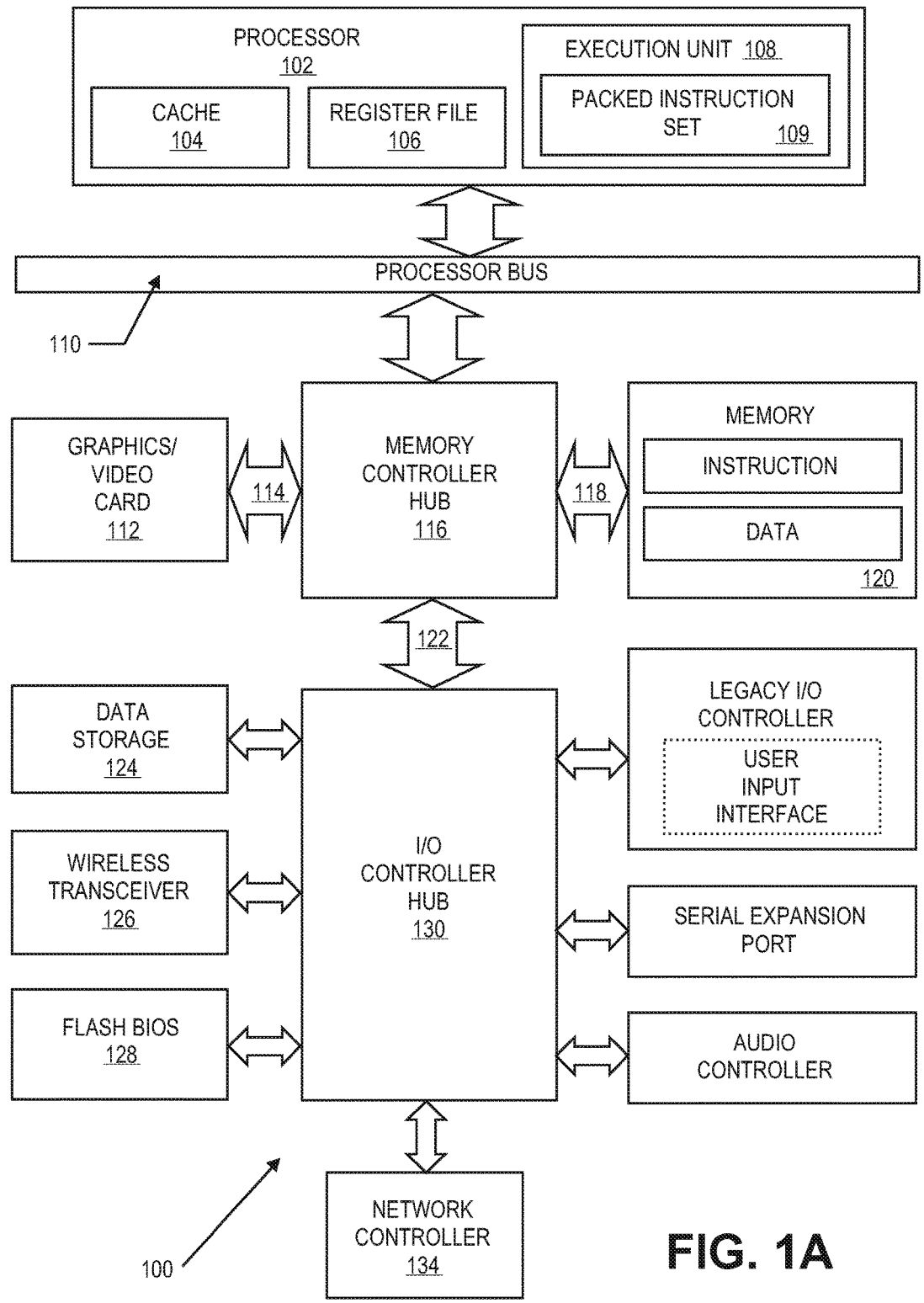
FIG. 1A is a block diagram of a system according to one embodiment.

The following description describes an instruction and processing logic to increase availability in a multi-level memory configuration within or in association with a processor, computer system, or other processing apparatus. In the following description, numerous specific details such as processing logic, processor types, micro-architectural conditions, events, enablement mechanisms, and the like are set forth in order to provide a more thorough understanding of the embodiments described herein. One skilled in the art will appreciate that the invention may be practiced without such specific details. Additionally, some well-known structures, circuits, and the like have not been shown in detail to avoid unnecessarily obscuring specific details of the embodiments described herein.

Although the following embodiments are described with reference to a processor, other embodiments are applicable to other types of integrated circuits and logic devices. Similar techniques and teachings can be applied to other types of circuits or semiconductor devices that can benefit from higher pipeline throughput and improved performance. The teachings of the embodiments are applicable to any processor or machine that performs data manipulations. However, the embodiments are not limited to processors or machines that perform 512-bit, 256-bit, 128-bit, 64-bit, 32-bit, or 16-bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments rather than to provide an exhaustive list of all possible implementations of embodiments.

Although the below examples describe instruction handling and distribution in the context of execution units and logic circuits, other embodiments can be accomplished by way of a data or instructions stored on a machine-readable, tangible medium, which when performed by a machine cause the machine to perform functions consistent with at least one embodiment of the invention. In one embodiment, functions associated with embodiments are embodied in machine-executable instructions. The instructions can be used to cause a general-purpose or special-purpose processor that is programmed with the instructions to perform operations as described herein. Embodiments can be provided as a computer program product or software which may include a machine or computer-readable medium having stored thereon instructions which may be used to program a computer (or other electronic devices) to perform one or more operations according to embodiments described herein. Alternatively, operations can be performed by specific hardware components that contain fixed-function logic for performing the steps, or by any combination of programmed computer components and fixed-function hardware components. Instructions used to program logic to perform embodiments of the invention can be stored within a memory in the system, such as DRAM, cache, flash memory, or other storage. Furthermore, the instructions can be distributed via a network or by way of other computer readable media.

In modern processors, a number of different execution units are used to process and execute a variety of code and instructions. Not all instructions are created equal as some are quicker to complete while others can take a number of clock cycles to complete. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more computer systems are used in Internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that can logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type are referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data are generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that includes execution units to execute an instruction in accordance with an embodiment described herein. System 100 includes a component, such as a processor 102 to employ execution units including logic to perform algorithms for processing data, such as in the embodiment described herein. System 100 is representative of processing systems based on the PENTIUM, CORE, Xeon, and/or Atom microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments are not limited to any specific combination of hardware circuitry and software.

Embodiments are not limited to computer systems. Alternative embodiments can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

FIG. 1A is a block diagram of a computer system 100 formed with a processor 102 that includes one or more execution units 108 to perform an algorithm to perform at least one instruction, according to an embodiment. One embodiment may be described in the context of a single processor desktop or server system, but alternative embodiments can be included in a multiprocessor system. System 100 is an example of a 'hub' system architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In one embodiment, the processor 102 includes a Level 1 (L1) internal cache memory 104. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, status registers, and instruction pointer register.

Execution unit 108, including logic to perform integer and floating point operations, also resides in the processor 102. The processor 102 also includes a microcode (ucode) ROM that stores microcode for certain macroinstructions. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of an execution unit 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102.

In one embodiment a memory controller hub (MCH) 116 is coupled to the processor bus 110 and memory 120. The processor 102 can communicate to the MCH 116 via a processor bus 110. The MCH 116 is a system logic chip that provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

In some embodiments the system I/O 122 is a proprietary hub interface bus that is used to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 1B:
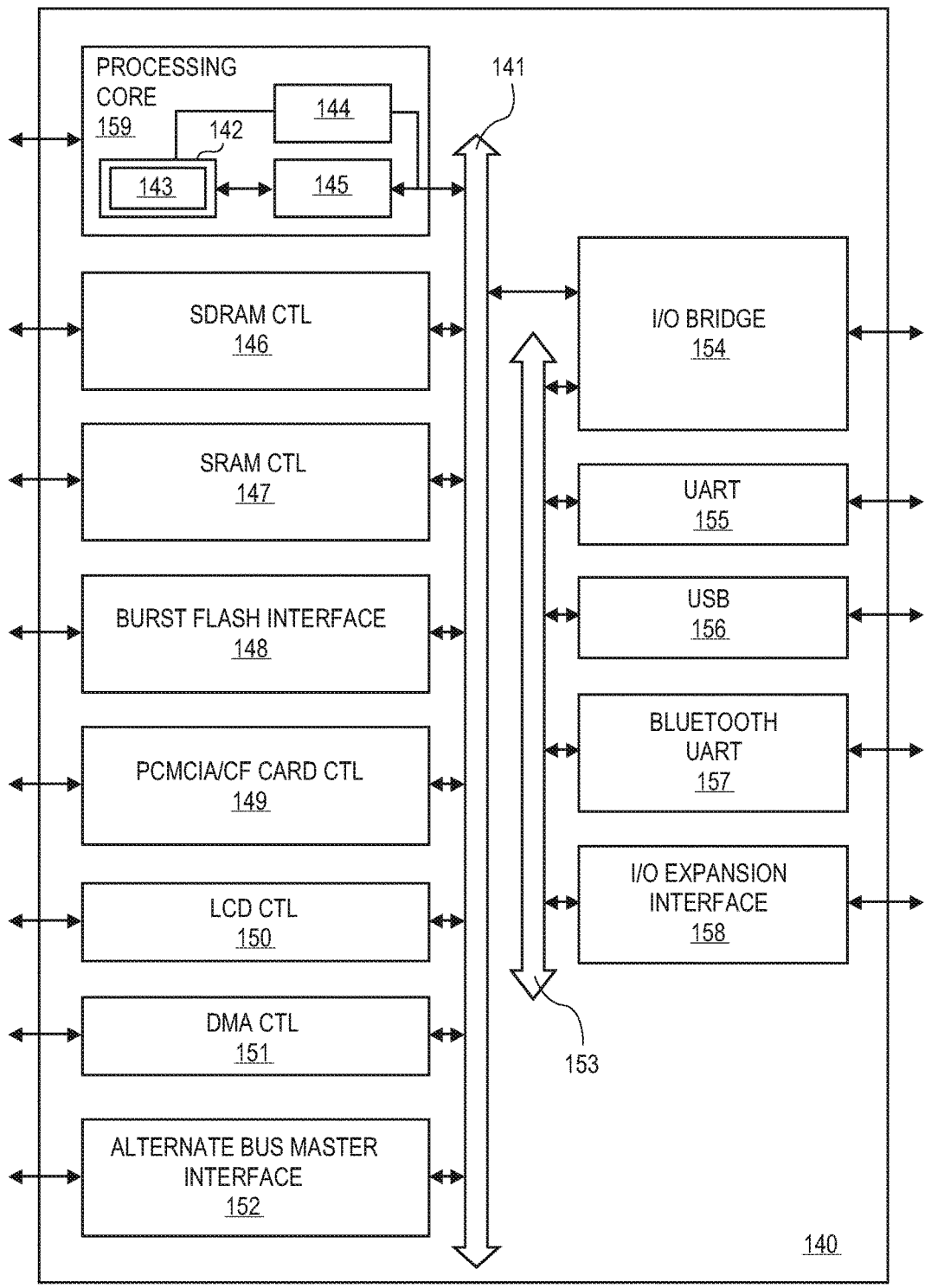
FIG. 1B is a block diagram of a system according to one embodiment.

FIG. 1B illustrates a data processing system 140 which implements the principles of one embodiment. It will be readily appreciated by one of skill in the art that the embodiments described herein can be used with alternative processing systems without departure from the scope of embodiments of the invention.

The data processing system 140 comprises a processing core 159 capable of performing at least one instruction in accordance with one embodiment. For one embodiment, processing core 159 represents a processing unit of any type of architecture, including but not limited to CISC, RISC or VLIW type architecture. Processing core 159 may also be suitable for manufacture in one or more process technologies and by being represented on a machine readable media in sufficient detail, may be suitable to facilitate said manufacture.

Processing core 159 comprises an execution unit 142, a set of register file(s) 145, and a decoder 144. Processing core 159 also includes additional circuitry (not shown) which is not necessary to the understanding of the various embodiments. Execution unit 142 is used for executing instructions received by processing core 159. In addition to performing typical processor instructions, execution unit 142 can perform instructions in packed instruction set 143 for performing operations on packed data formats. Packed instruction set 143 includes instructions for performing embodiments of the invention and other packed instructions. Execution unit 142 is coupled to register file 145 by an internal bus. Register file 145 represents a storage area on processing core 159 for storing information, including data. As previously mentioned, it is understood that the storage area used for storing the packed data is not critical. Execution unit 142 is coupled to decoder 144. Decoder 144 is used for decoding instructions received by processing core 159 into control signals and/or microcode entry points. In response to these control signals and/or microcode entry points, execution unit 142 performs the appropriate operations. In one embodiment, the decoder is used to interpret the opcode of the instruction, which will indicate what operation should be performed on the corresponding data indicated within the instruction.

Processing core 159 is coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 capable of performing SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
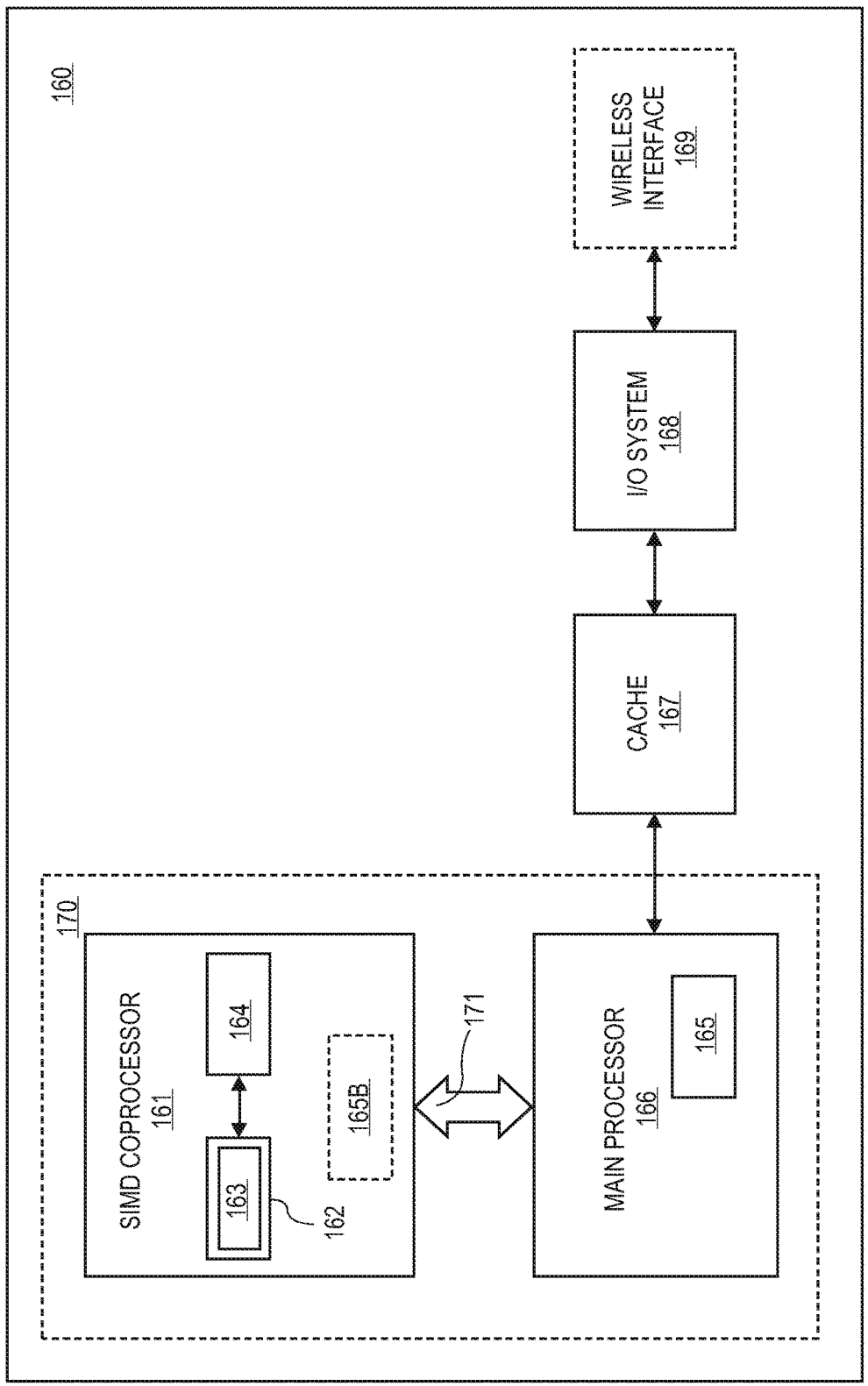
FIG. 1C is a block diagram of a system according to one embodiment.

FIG. 1C illustrates yet alternative embodiments of a data processing system capable of performing SIMD text string comparison operations. In accordance with one alternative embodiment, data processing system 160 may include a main processor 166, a SIMD coprocessor 161, a cache memory 167, and an input/output system 168. The input/output system 168 may optionally be coupled to a wireless interface 169. SIMD coprocessor 161 is capable of performing operations including instructions in accordance with one embodiment. Processing core 170 may be suitable for manufacture in one or more process technologies and by being represented on a machine readable media in sufficient detail, may be suitable to facilitate the manufacture of all or part of data processing system 160 including processing core 170.

For one embodiment, SIMD coprocessor 161 comprises an execution unit 162 and a set of register file(s) 164. One embodiment of main processor 166 comprises a decoder 165 to recognize instructions of instruction set 163 including instructions in accordance with one embodiment for execution by execution unit 162. For alternative embodiments, SIMD coprocessor 161 also comprises at least part of decoder 165B to decode instructions of instruction set 163. Processing core 170 also includes additional circuitry (not shown) which is not necessary to the understanding of the embodiments described herein.

In operation, the main processor 166 executes a stream of data processing instructions that control data processing operations of a general type including interactions with the cache memory 167, and the input/output system 168. Embedded within the stream of data processing instructions are SIMD coprocessor instructions. The decoder 165 of main processor 166 recognizes these SIMD coprocessor instructions as being of a type that should be executed by an attached SIMD coprocessor 161. Accordingly, the main processor 166 issues these SIMD coprocessor instructions (or control signals representing SIMD coprocessor instructions) on the coprocessor bus 171 where from they are received by any attached SIMD coprocessors. In this case, the SIMD coprocessor 161 will accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. For one embodiment of processing core 170, main processor 166, and a SIMD coprocessor 161 are integrated into a single processing core 170 comprising an execution unit 162, a set of register file(s) 164, and a decoder 165 to recognize instructions of instruction set 163 including instructions in accordance with one embodiment.

Figure 2:
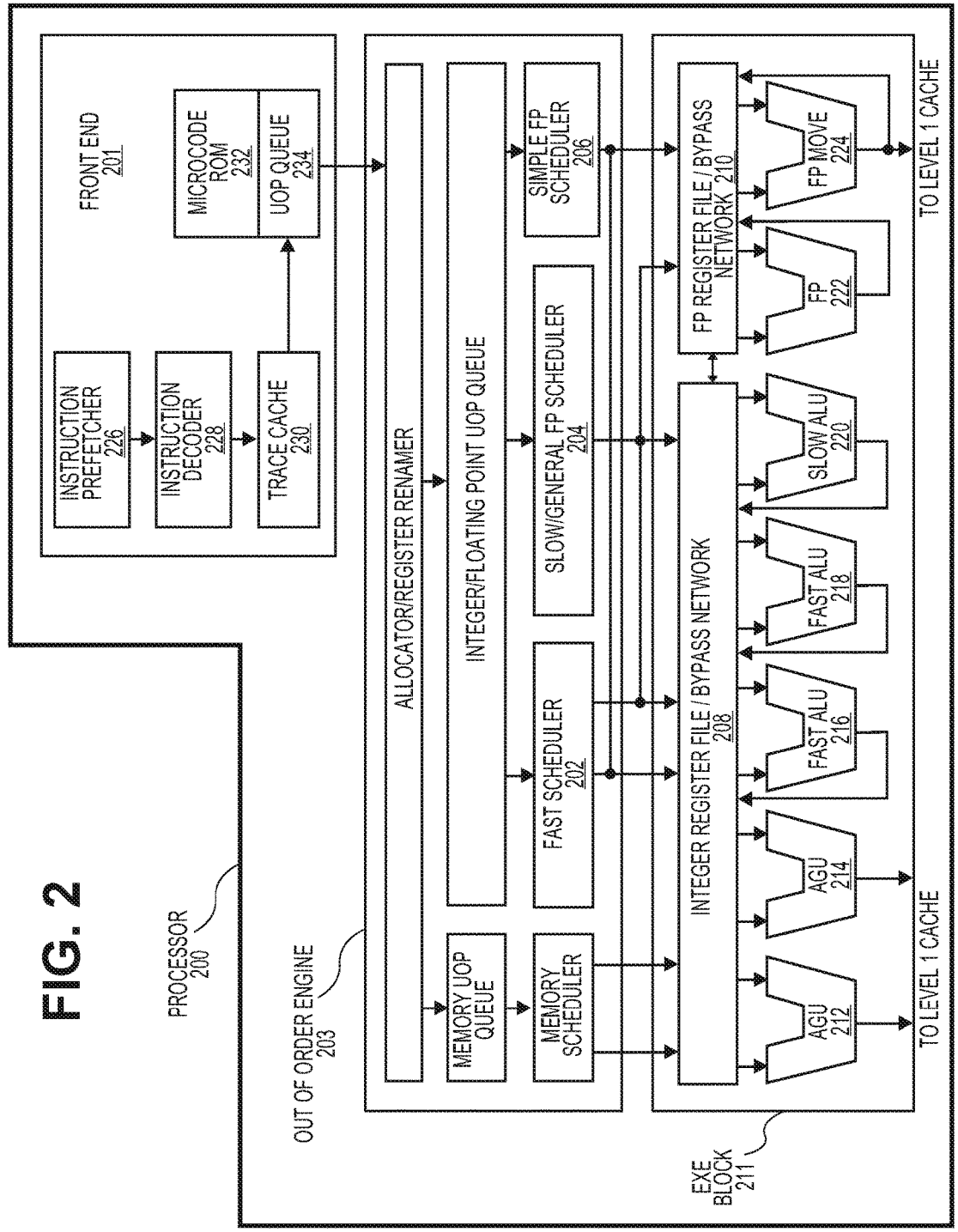
FIG. 2 is a block diagram of a processor according to one embodiment.

FIG. 2 is a block diagram of the micro-architecture for a processor 200 that includes logic circuits to perform instructions, according to an embodiment. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete a instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to a entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206, determine when a uop is ready to execute based on the readiness of their dependent input register operand sources and the availability of the execution resources the uops need to complete their operation. The fast scheduler 202 of one embodiment can schedule on each half of the main clock cycle while the other schedulers can only schedule once per main processor clock cycle. The schedulers arbitrate for the dispatch ports to schedule uops for execution.

Register files 208, 210, sit between the schedulers 202, 204, 206, and the execution units 212, 214, 216, 218, 220, 222, 224 in the execution block 211. There is a separate register file 208, 210, for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128-bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. Instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220, are described in the context of performing integer operations on 64 bit data operands. In alternative embodiments, the ALUs 216, 218, 220, can be implemented to support a variety of data bits including 16, 32, 128, 256, etc. Similarly, the floating point units 222, 224, can be implemented to support a range of operands having bits of various widths. For one embodiment, the floating point units 222, 224, can operate on 128-bit wide packed data operands in conjunction with SIMD and multimedia instructions.

In one embodiment, the uops schedulers 202, 204, 206, dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64-bit wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128-bit wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

In the examples of the following figures, a number of data operands are described. FIG. 3A illustrates various packed data type representations in multimedia registers, according to an embodiment. FIG. 3A illustrates data types for a packed byte 310, a packed word 320, and a packed doubleword (dword) 330 for 128-bit wide operands. The packed byte format 310 of this example is 128 bits long and contains sixteen packed byte data elements. A byte is defined here as 8 bits of data. Information for each byte data element is stored in bit 7 through bit 0 for byte 0, bit 15 through bit 8 for byte 1, bit 23 through bit 16 for byte 2, and finally bit 120 through bit 127 for byte 15. Thus, all available bits are used in the register. This storage arrangement increases the storage efficiency of the processor. As well, with sixteen data elements accessed, one operation can now be performed on sixteen data elements in parallel.

Generally, a data element is an individual piece of data that is stored in a single register or memory location with other data elements of the same length. In packed data sequences relating to SSEx technology, the number of data elements stored in a XMM register is 128 bits divided by the length in bits of an individual data element. Similarly, in packed data sequences relating to MMX and SSE technology, the number of data elements stored in an MMX register is 64 bits divided by the length in bits of an individual data element. Although the data types illustrated in FIG. 3A are 128 bits long, embodiments are provided that also operate with 64 bit wide or other sized operands. The packed word format 320 of this example is 128 bits long and contains eight packed word data elements. Each packed word contains sixteen bits of information. The packed doubleword format 330 of FIG. 3A is 128 bits long and contains four packed doubleword data elements. Each packed doubleword data element contains thirty two bits of information. A packed quadword is 128 bits long and contains two packed quad-word data elements.

Figure 3B:
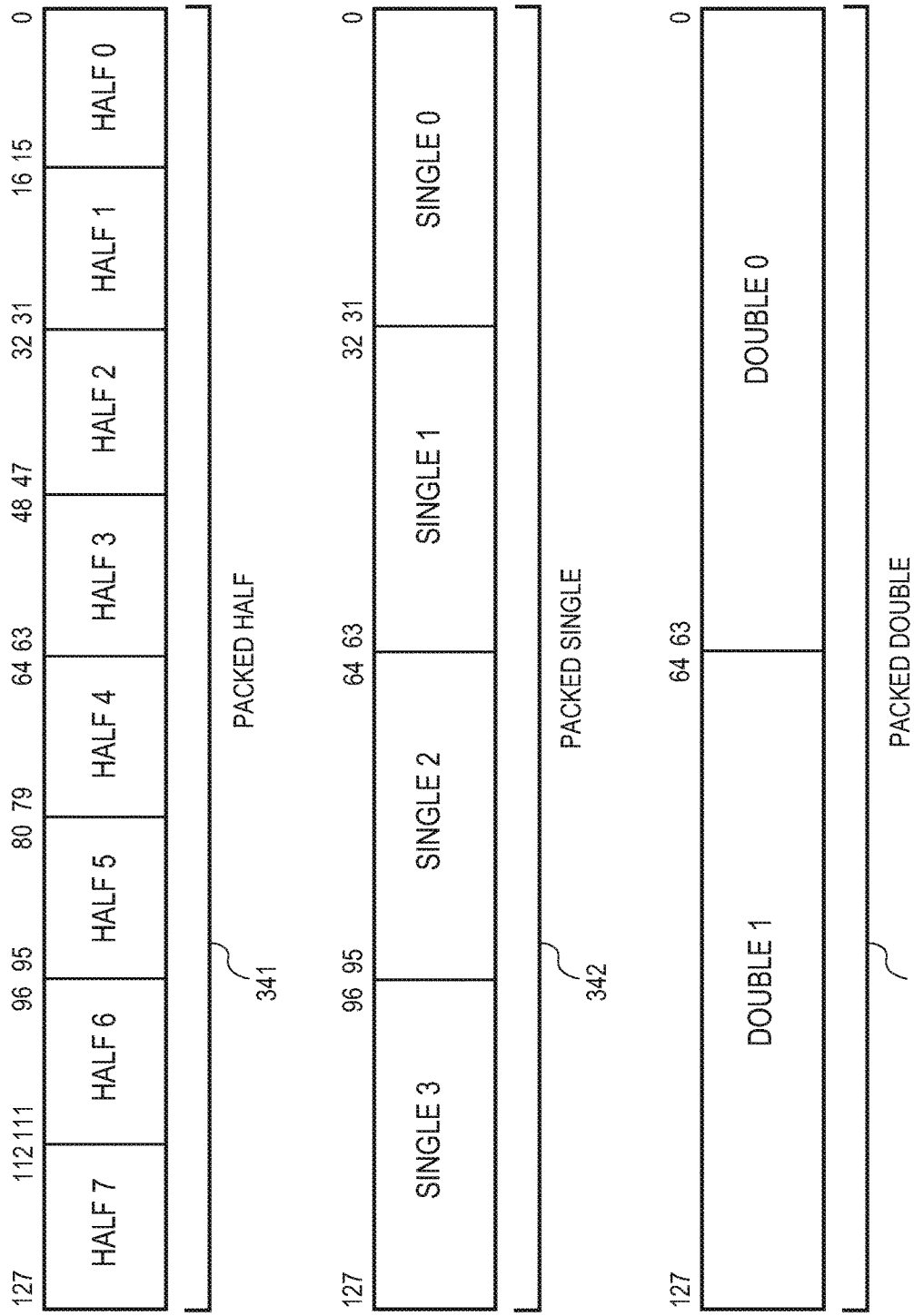
FIG. 3B illustrates packed data types according one embodiment.

FIG. 3B illustrates alternative in-register data storage formats. Each packed data can include more than one independent data element. Three packed data formats are illustrated; packed half 341, packed single 342, and packed double 343. One embodiment of packed half 341, packed single 342, and packed double 343 contain fixed-point data elements. For an alternative embodiment one or more of packed half 341, packed single 342, and packed double 343 may contain floating-point data elements. One alternative embodiment of packed half 341 is one hundred twenty-eight bits long containing eight 16-bit data elements. One embodiment of packed single 342 is one hundred twenty-eight bits long and contains four 32-bit data elements. One embodiment of packed double 343 is one hundred twenty-eight bits long and contains two 64-bit data elements. It will be appreciated that such packed data formats may be further extended to other register lengths, for example, to 96-bits, 160-bits, 192-bits, 224-bits, 256-bits or more.

FIG. 3C illustrates various signed and unsigned packed data type representations in multimedia registers, according to an embodiment. Unsigned packed byte representation 344 illustrates the storage of an unsigned packed byte in a SIMD register. Information for each byte data element is stored in bit seven through bit zero for byte zero, bit fifteen through bit eight for byte one, bit twenty-three through bit sixteen for byte two, and finally bit one hundred twenty through bit one hundred twenty-seven for byte fifteen. Thus, all available bits are used in the register. This storage arrangement can increase the storage efficiency of the processor. As well, with sixteen data elements accessed, one operation can now be performed on sixteen data elements in a parallel fashion. Signed packed byte representation 345 illustrates the storage of a signed packed byte. Note that the eighth bit of every byte data element is the sign indicator. Unsigned packed word representation 346 illustrates how word seven through word zero are stored in a SIMD register. Signed packed word representation 347 is similar to the unsigned packed word in-register representation 346. Note that the sixteenth bit of each word data element is the sign indicator. Unsigned packed doubleword representation 348 shows how doubleword data elements are stored. Signed packed doubleword representation 349 is similar to unsigned packed doubleword in-register representation 348. Note that the necessary sign bit is the thirty-second bit of each doubleword data element.

Figure 3D:
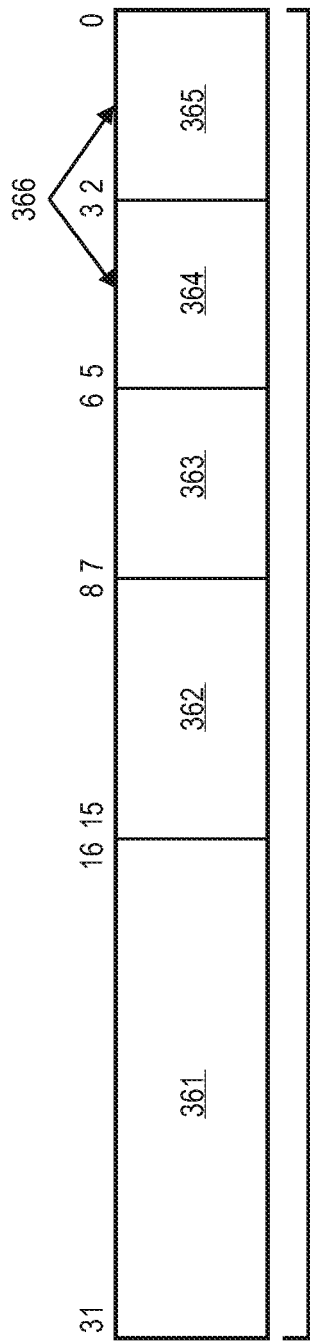
FIG. 3D illustrates an instruction encoding according to one embodiment.

FIG. 3D is a depiction of one embodiment of an operation encoding (opcode) format 360, having thirty-two or more bits, and register/memory operand addressing modes corresponding with a type of opcode format described in the "IA-32 Intel Architecture Software Developer's Manual Volume 2: Instruction Set Reference," which is which is available from Intel Corporation, Santa Clara, Calif. on the world-wide-web (www) at intel.com/design/litcentr. In one embodiment, and instruction may be encoded by one or more of fields 361 and 362. Up to two operand locations per instruction may be identified, including up to two source operand identifiers 364 and 365. For one embodiment, destination operand identifier 366 is the same as source operand identifier 364, whereas in other embodiments they are different. For an alternative embodiment, destination operand identifier 366 is the same as source operand identifier 365, whereas in other embodiments they are different.

In one embodiment, one of the source operands identified by source operand identifiers 364 and 365 is overwritten by the results of the text string comparison operations, whereas in other embodiments identifier 364 corresponds to a source register element and identifier 365 corresponds to a destination register element. For one embodiment, operand identifiers 364 and 365 may be used to identify 32-bit or 64-bit source and destination operands.

Figure 3E:
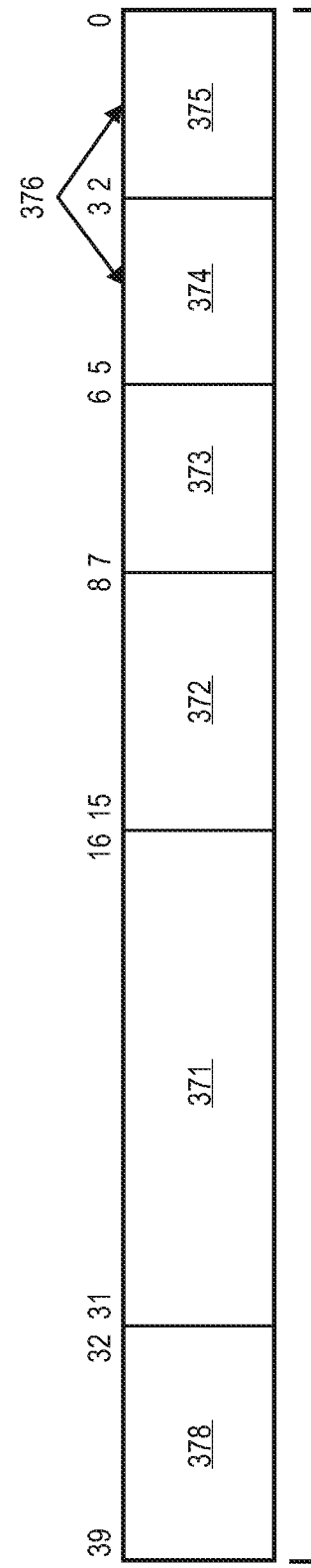
FIG. 3E illustrates an instruction encoding according to one embodiment.

FIG. 3E is a depiction of another alternative operation encoding (opcode) format 370, having forty or more bits. Opcode format 370 corresponds with opcode format 360 and comprises an optional prefix byte 378. An instruction according to one embodiment may be encoded by one or more of fields 378, 371, and 372. Up to two operand locations per instruction may be identified by source operand identifiers 374 and 375 and by prefix byte 378. For one embodiment, prefix byte 378 may be used to identify 32-bit or 64-bit source and destination operands. For one embodiment, destination operand identifier 376 is the same as source operand identifier 374, whereas in other embodiments they are different. For an alternative embodiment, destination operand identifier 376 is the same as source operand identifier 375, whereas in other embodiments they are different. In one embodiment, an instruction operates on one or more of the operands identified by operand identifiers 374 and 375 and one or more operands identified by the operand identifiers 374 and 375 is overwritten by the results of the instruction, whereas in other embodiments, operands identified by identifiers 374 and 375 are written to another data element in another register. Opcode formats 360 and 370 allow register to register, memory to register, register by memory, register by register, register by immediate, register to memory addressing specified in part by MOD fields 363 and 373 and by optional scale-index-base and displacement bytes.

Figure 3F:
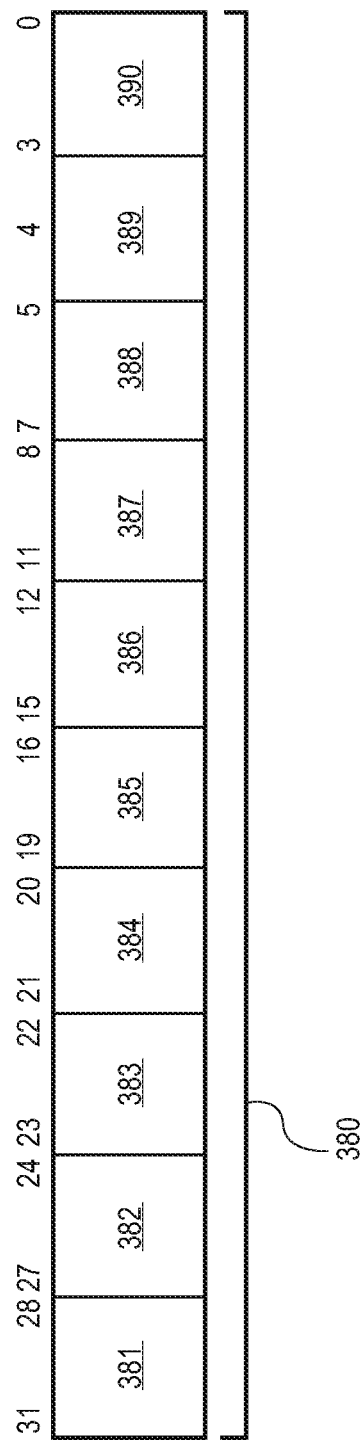
FIG. 3F illustrates an instruction encoding according to one embodiment.

Turning next to FIG. 3F, in some alternative embodiments, 64 bit single instruction multiple data (SIMD) arithmetic operations may be performed through a coprocessor data processing (CDP) instruction. Operation encoding (opcode) format 380 depicts one such CDP instruction having CDP opcode fields 382 and 389. The type of CDP instruction, for alternative embodiments, operations may be encoded by one or more of fields 383, 384, 387, and 388. Up to three operand locations per instruction may be identified, including up to two source operand identifiers 385 and 390 and one destination operand identifier 386. One embodiment of the coprocessor can operate on 8, 16, 32, and 64 bit values. For one embodiment, an instruction is performed on integer data elements. In some embodiments, an instruction may be executed conditionally, using condition field 381. For some embodiments, source data sizes may be encoded by field 383. In some embodiments, Zero (Z), negative (N), carry (C), and overflow (V) detection can be done on SIMD fields. For some instructions, the type of saturation may be encoded by field 384.

FIG. 4A is a block diagram illustrating an in-order pipeline and a register renaming stage, out-of-order issue/execution pipeline according to at least one embodiment of the invention. FIG. 4B is a block diagram illustrating an in-order architecture core and a register renaming logic, out-of-order issue/execution logic to be included in a processor according to at least one embodiment of the invention. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both are coupled to a memory unit 470.

The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 154 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 162 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5:
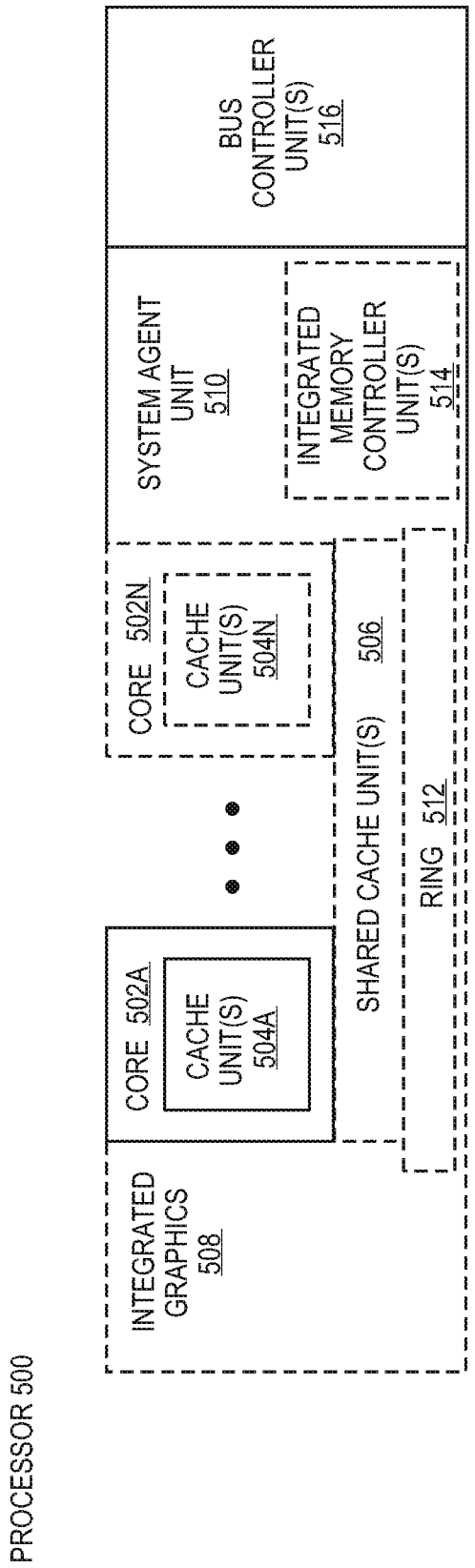
FIG. 5 is a block diagram of a processor according to one embodiment.

FIG. 5 is a block diagram of a single core processor and a multicore processor 500 with integrated memory controller and graphics according to embodiments of the invention. The solid lined boxes in FIG. 5 illustrate a processor 500 with a single core 502A, a system agent 510, a set of one or more bus controller units 516, while the optional addition of the dashed lined boxes illustrates an alternative processor 500 with multiple cores 502A-N, a set of one or more integrated memory controller unit(s) 514 in the system agent unit 510, and special purpose logic including integrated graphics logic 508. Each of processor cores 502A-502N includes one or more internal cache units 504A-504N. In some embodiments each processor core also has access to one or more shared cached units 506.

The internal cache units 504A-504N and shared cache units 506 represent a cache memory hierarchy within the processor 500. The cache memory hierarchy is a portion of an overall memory hierarchy for the processor that includes one or more internal cache units 504A-504N, the one or more shared cache units 506, and external memory (not shown) coupled to the set of integrated memory controller units 514. The set of shared cache units 506 may include one or more mid-level caches, such as level 2 (L2), level 3 (L3), level 4 (L4), or other levels of cache, a last level cache (LLC), and/or combinations thereof. While in one embodiment a ring based interconnect unit 512 interconnects the integrated graphics logic 508, the set of shared cache units 506, and the system agent unit 510, alternative embodiments may use any number of well-known techniques for interconnecting such units.

In some embodiments, one or more of the cores 502A-N are capable of multi-threading. The system agent 510 includes those components coordinating and operating cores 502A-N. The system agent unit 510 may include for example a power control unit (PCU) and a display unit. The PCU may be or include logic and components needed for regulating the power state of the cores 502A-N and the integrated graphics logic 508. The display unit is for driving one or more externally connected displays.

The cores 502A-N may be homogenous or heterogeneous in terms of architecture and/or instruction set. For example, some of the cores 502A-N may be in order while others are out-of-order. As another example, two or more of the cores 502A-N may be capable of execution the same instruction set, while others may be capable of executing only a subset of that instruction set or a different instruction set.

The processor may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor 500 may be a part of and/or may be implemented on one or more substrates using any of a number of process technologies, such as, for example, BiCMOS, CMOS, or NMOS.

Figure 6:
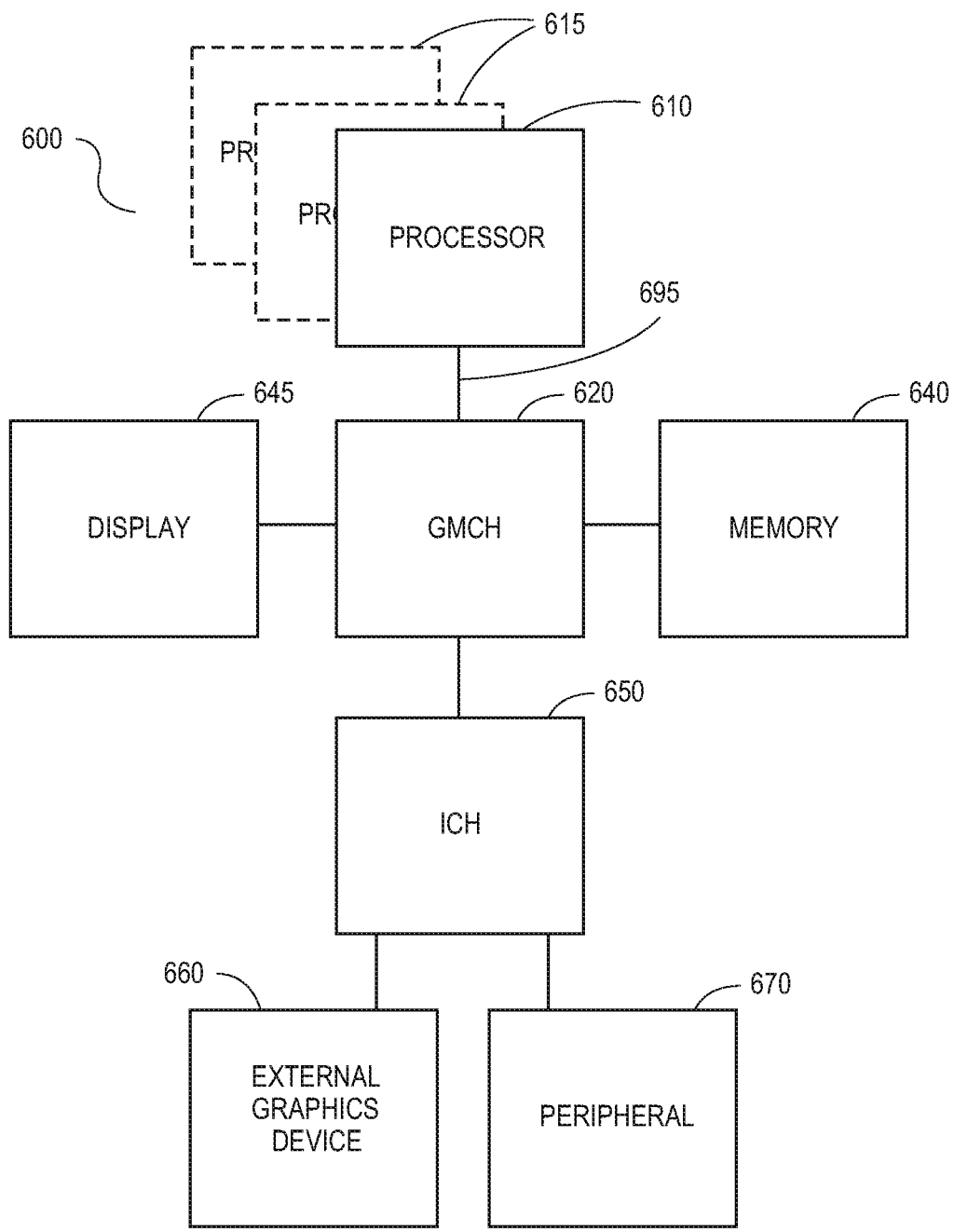
FIG. 6 is a block diagram of a computer system according to one embodiment.
Figure 7:
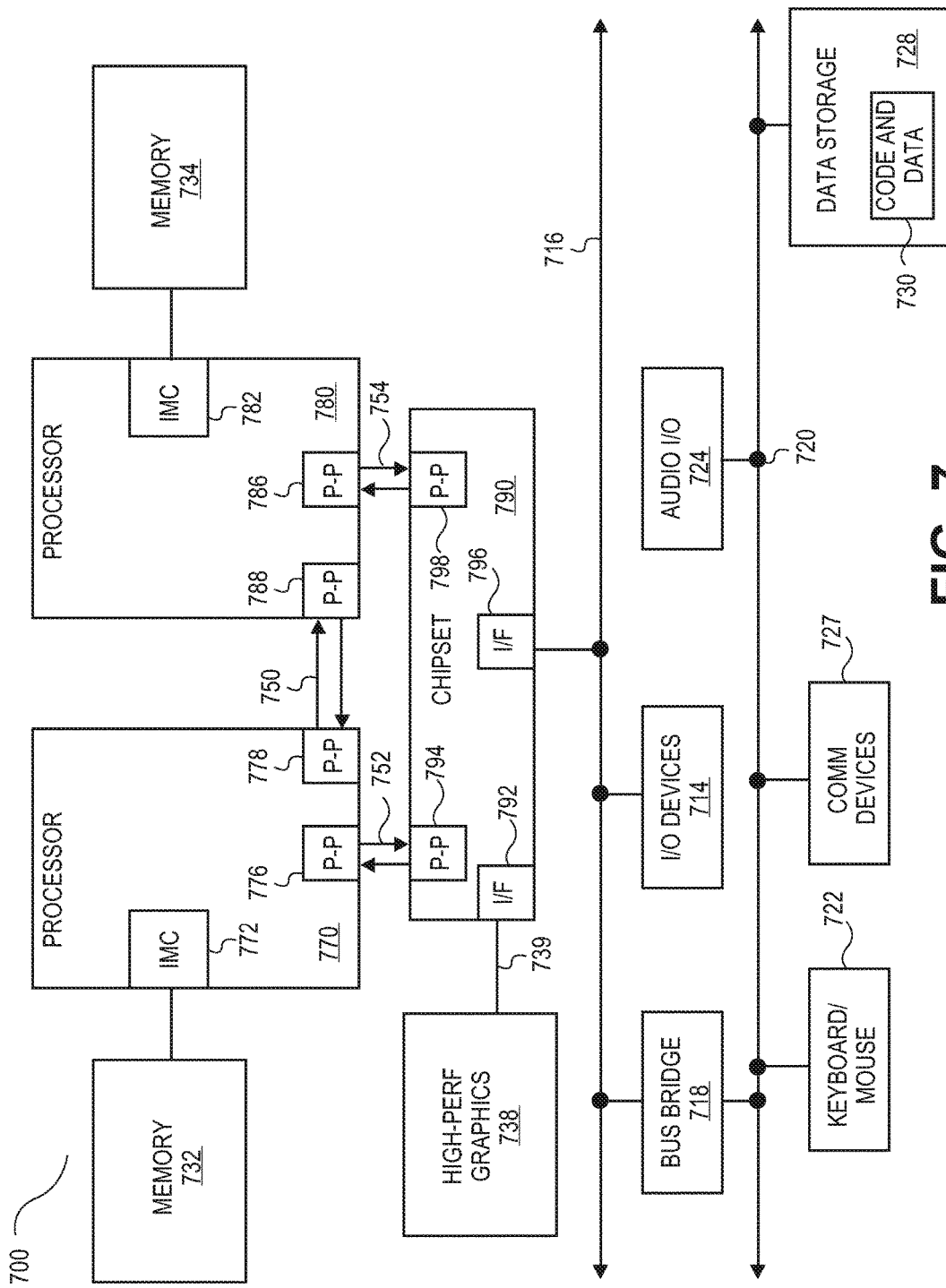
FIG. 7 is a block diagram of a computer system according to one embodiment.
Figure 8:
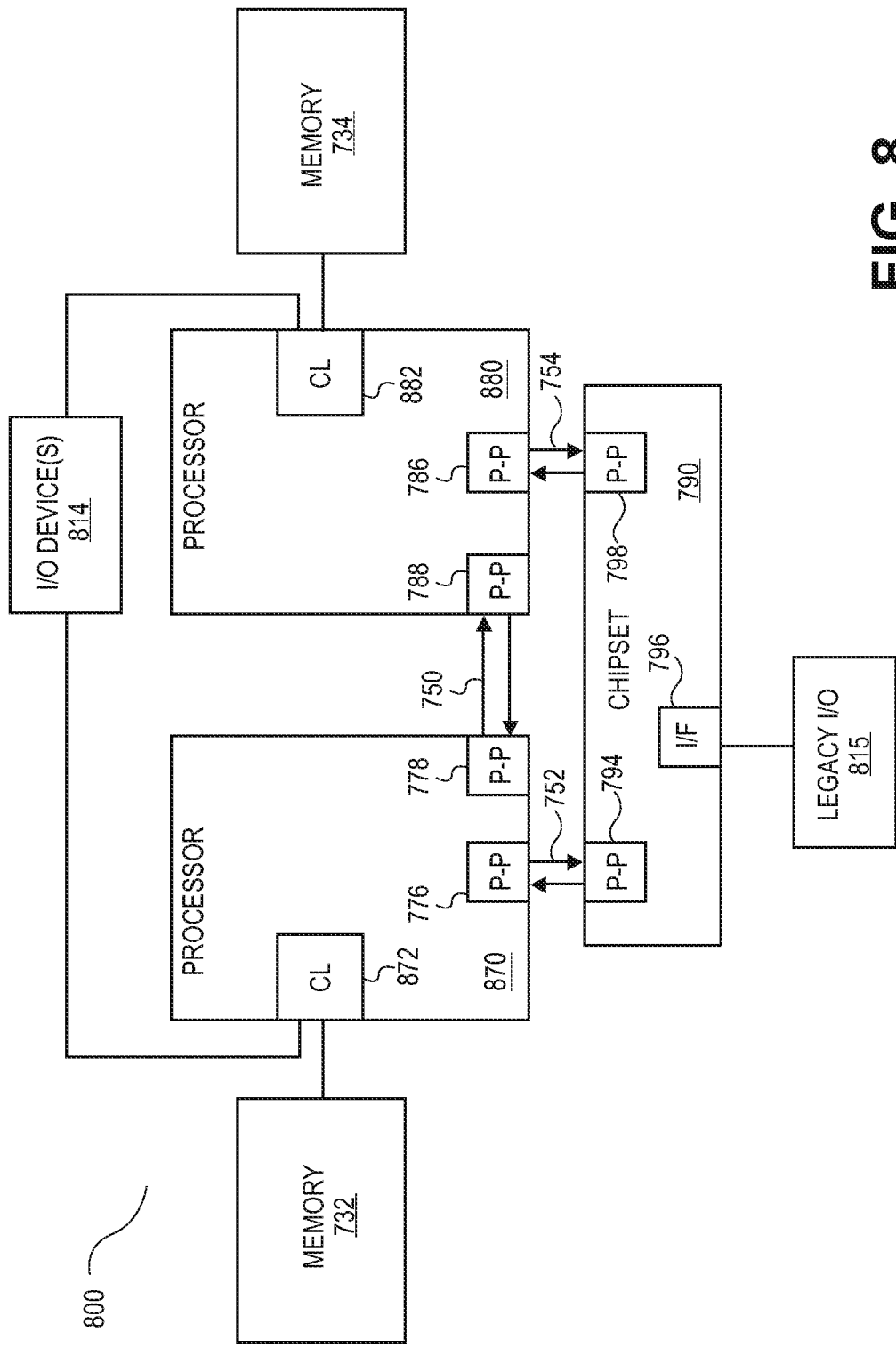
FIG. 8 is a block diagram of a computer system according to one embodiment.
Figure 9:
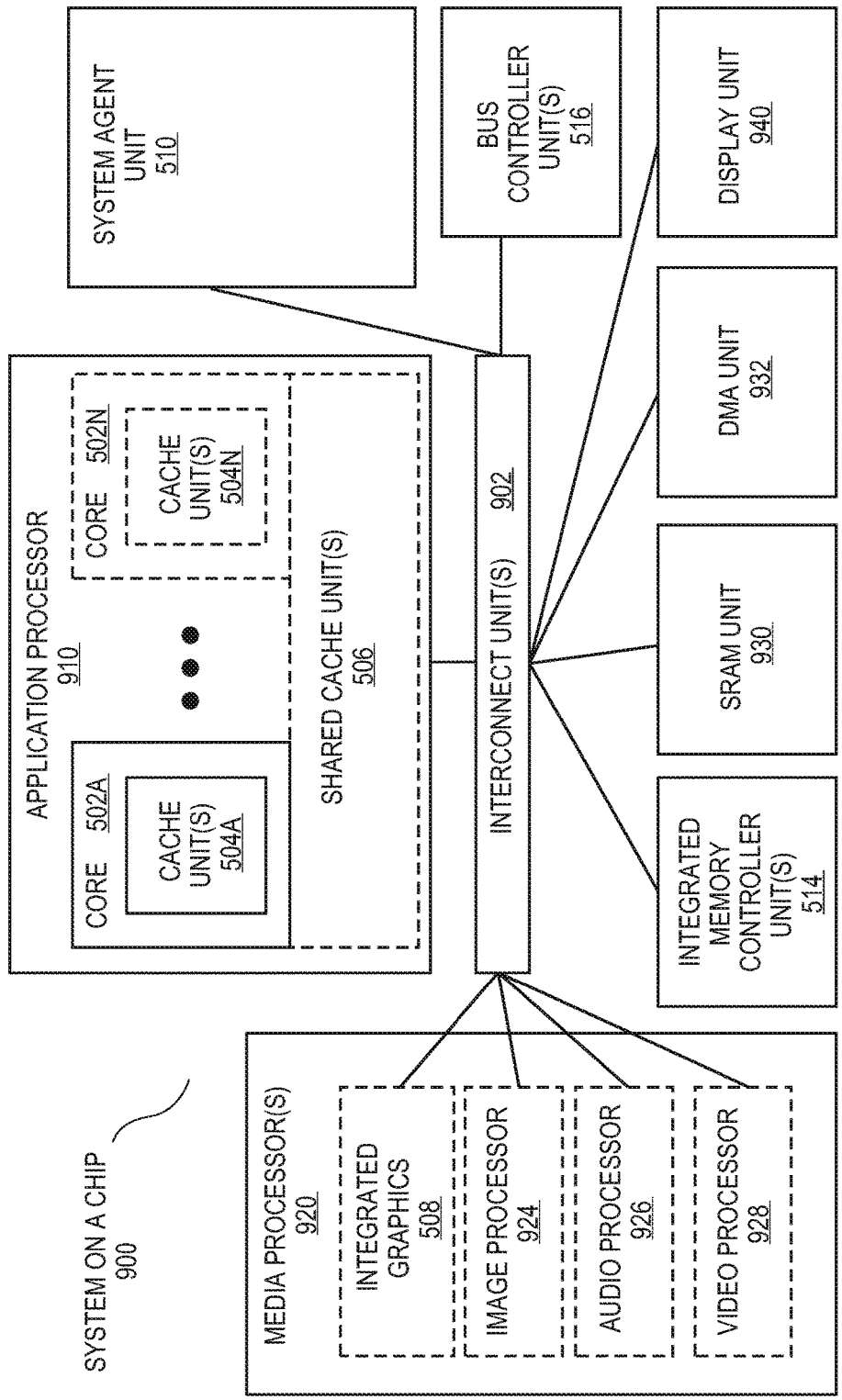
FIG. 9 is a block diagram of a system-on-a-chip according to one embodiment.

FIGS. 6-8 are exemplary systems suitable for including the processor 500, while FIG. 9 is an exemplary system on a chip (SoC) that may include one or more of the cores 502. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 6, shown is a block diagram of a system 600 in accordance with one embodiment. The system 600 may include one or more processors 610, 615, which are coupled to graphics memory controller hub (GMCH) 620. The optional nature of additional processors 615 is denoted in FIG. 6 with broken lines.

Each processor 610,615 may be some version of the processor 500. However, it should be noted that it is unlikely that integrated graphics logic and integrated memory control units would exist in the processors 610,615. FIG. 6 illustrates that the GMCH 620 may be coupled to a memory 640 that may be, for example, a dynamic random access memory (DRAM). The DRAM may, for at least one embodiment, be associated with a non-volatile cache.

The GMCH 620 may be a chipset, or a portion of a chipset. The GMCH 620 may communicate with the processor(s) 610, 615 and control interaction between the processor(s) 610, 615 and memory 640. The GMCH 620 may also act as an accelerated bus interface between the processor(s) 610, 615 and other elements of the system 600. For at least one embodiment, the GMCH 620 communicates with the processor(s) 610, 615 via a multi-drop bus, such as a frontside bus (FSB) 695.

Furthermore, GMCH 620 is coupled to a display 645 (such as a flat panel display). GMCH 620 may include an integrated graphics accelerator. GMCH 620 is further coupled to an input/output (I/O) controller hub (ICH) 650, which may be used to couple various peripheral devices to system 600. Shown for example in the embodiment of FIG. 6 is an external graphics device 660, which may be a discrete graphics device coupled to ICH 650, along with another peripheral device 670.

Alternatively, additional or different processors may also be present in the system 600. For example, additional processor(s) 615 may include additional processors(s) that are the same as processor 610, additional processor(s) that are heterogeneous or asymmetric to processor 610, accelerators (such as, e.g., graphics accelerators or digital signal processing (DSP) units), field programmable gate arrays, or any other processor. There can be a variety of differences between the physical resources 610, 615 in terms of a spectrum of metrics of merit including architectural, micro-architectural, thermal, power consumption characteristics, and the like. These differences may effectively manifest themselves as asymmetry and heterogeneity amongst the processors 610, 615. For at least one embodiment, the various processors 610, 615 may reside in the same die package.

Referring now to FIG. 7, shown is a block diagram of a second system 700 in accordance with an embodiment. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 500 as one or more of the processors 610,615.

While shown with only two processors 770, 780, it is to be understood that the scope of the embodiments is not so limited. In other embodiments, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 across a high-performance graphics interface 739 that is coupled with the chipset 790 via an interface 792.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the embodiments is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Referring now to FIG. 8, shown is a block diagram of a third system 800 in accordance with an embodiment. Like elements in FIGS. 7 and 8 bear like reference numerals, and certain aspects of FIG. 7 have been omitted from FIG. 8 in order to avoid obscuring other aspects of FIG. 8.

FIG. 8 illustrates that the processors 870, 880 may include integrated memory and I/O control logic ("CL") 872 and 882, respectively. For at least one embodiment, the CL 872, 882 may include integrated memory controller units such as the integrated memory controller unit(s) 514 of FIG. 5 and the IMCs 772 and 782 of FIG. 7. In addition. CL 872, 882 may also include I/O control logic. FIG. 8 illustrates that not only are the memories 732, 734 coupled to the CL 872, 882, but also that one or more I/O device(s) 814 are also coupled to the control logic 872, 882. Legacy I/O devices 815 may be coupled to the chipset 790, for example, if those devices are not or cannot be coupled via the CL 872, 882.

Referring now to FIG. 9, shown is a block diagram of a SoC 900 in accordance with an embodiment. Similar elements in FIG. 5 bear like reference numerals. Also, dashed lined boxes are optional features on more advanced SoCs. In FIG. 9, an interconnect unit(s) 902 is coupled to: an application processor 910 which includes a set of one or more cores 502A-N including internal cache unit(s) 504A-N and shared cache unit(s) 506; a system agent unit 510; a bus controller unit(s) 516; an integrated memory controller unit(s) 514; a set or one or more media processors 920 which may include integrated graphics logic 508, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 10:
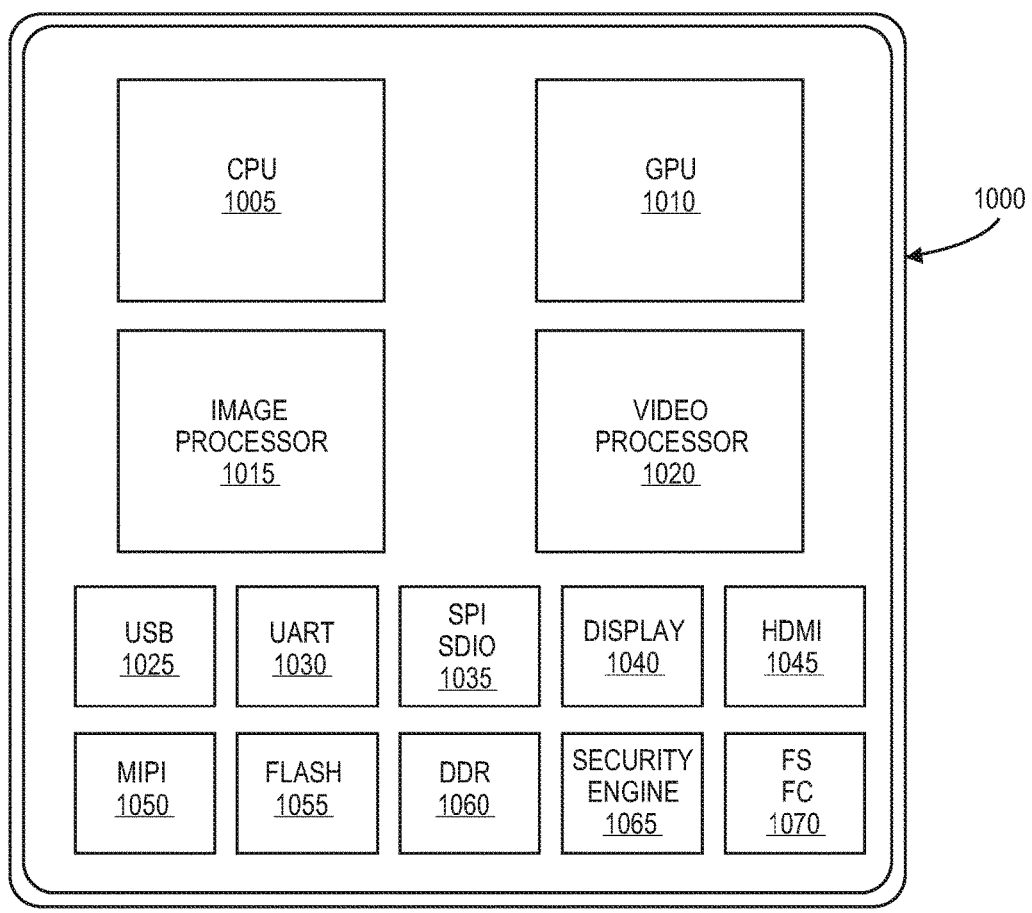
FIG. 10 is a block diagram of a processor according to one embodiment.

FIG. 10 illustrates a processor containing a central processing unit (CPU) and a graphics processing unit (GPU), which may perform at least one instruction according to one embodiment. In one embodiment, an instruction to perform operations according to at least one embodiment could be performed by the CPU. In another embodiment, the instruction could be performed by the GPU. In still another embodiment, the instruction may be performed through a combination of operations performed by the GPU and the CPU. For example, in one embodiment, an instruction in accordance with one embodiment may be received and decoded for execution on the GPU. However, one or more operations within the decoded instruction may be performed by a CPU and the result returned to the GPU for final retirement of the instruction. Conversely, in some embodiments, the CPU may act as the primary processor and the GPU as the co-processor.

In some embodiments, instructions that benefit from highly parallel, throughput processors may be performed by the GPU, while instructions that benefit from the performance of processors that benefit from deeply pipelined architectures may be performed by the CPU. For example, graphics, scientific applications, financial applications and other parallel workloads may benefit from the performance of the GPU and be executed accordingly, whereas more sequential applications, such as operating system kernel or application code may be better suited for the CPU.

In FIG. 10, processor 1000 includes a CPU 1005, GPU 1010, image processor 1015, video processor 1020, USB controller 1025, UART controller 1030, SPI/SDIO controller 1035, display device 1040, HDMI interface 1045, MIPI controller 1050, flash memory controller 1055, dual data rate (DDR) controller 1060, security engine 1065, and $I^2S/I^2C$ controller 1070. Other logic and circuits may be included in the processor of FIG. 10, including more CPUs or GPUs and other peripheral interface controllers.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machines 1165 that actually make the logic or processor. For example, IP cores, such as the Cortex™ family of processors developed by ARM Holdings, Ltd. and Loongson IP cores developed the Institute of Computing Technology (ICT) of the Chinese Academy of Sciences may be licensed or sold to various customers or licensees, such as Texas Instruments, Qualcomm, Apple, or Samsung and implemented in processors produced by these customers or licensees.

Figure 11:
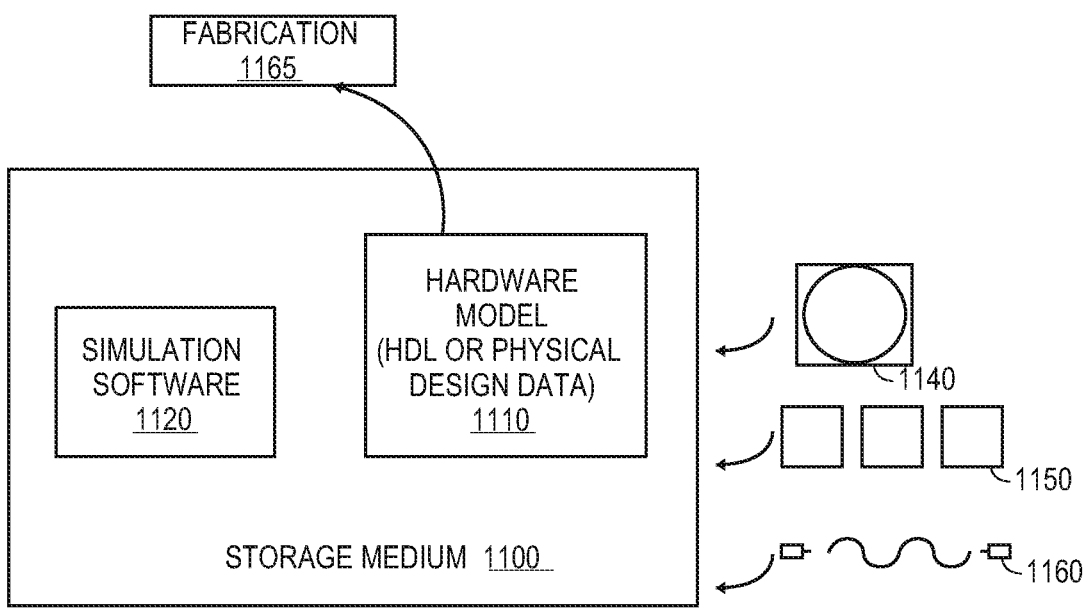
FIG. 11 is a block diagram of an IP core development system according to one embodiment.

FIG. 11 shows a block diagram illustrating the development of IP cores according to one embodiment. A Storage medium 1100 includes simulation software 1120 and/or hardware or software model 1110. In one embodiment, the data representing the IP core design can be provided to the storage medium 1100 via memory 1140 (e.g., hard disk), wired connection (e.g., internet) 1150 or wireless connection 1160. The IP core information generated by the simulation tool and model can then be transmitted to a fabrication facility where it can be fabricated by a $3^{rd}$ party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
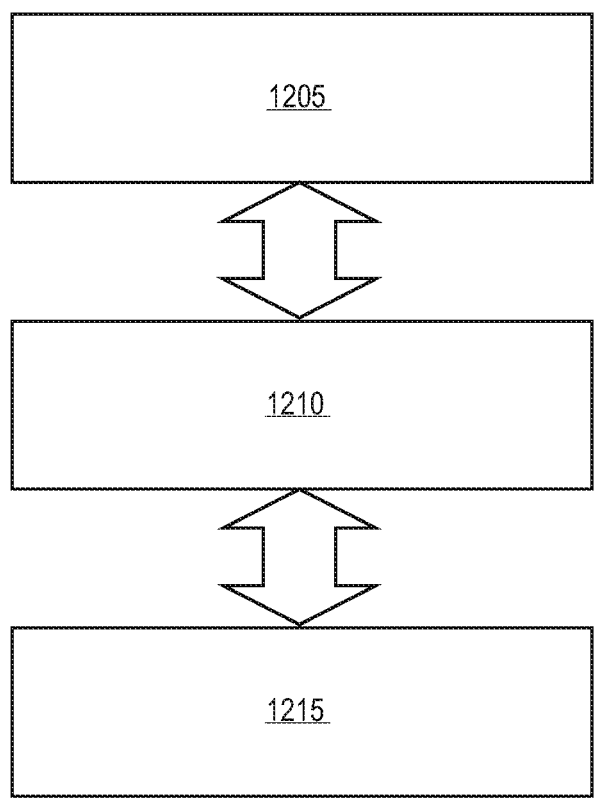
FIG. 12 illustrates an architecture emulation system according to one embodiment.

FIG. 12 illustrates how an instruction of a first type is emulated by a processor of a different type, according to one embodiment. In FIG. 12, program 1205 contains some instructions that may perform the same or substantially the same function as an instruction according to one embodiment. However the instructions of program 1205 may be of a type and/or format that is different or incompatible with processor 1215, meaning the instructions of the type in program 1205 may not be able to executed natively by the processor 1215. However, with the help of emulation logic, 1210, the instructions of program 1205 are translated into instructions that are natively capable of being executed by the processor 1215. In one embodiment, the emulation logic is embodied in hardware. In another embodiment, the emulation logic is embodied in a tangible, machine-readable medium containing software to translate instructions of the type in the program 1205 into the type natively executable by the processor 1215. In other embodiments, emulation logic is a combination of fixed-function or programmable hardware and a program stored on a tangible, machine-readable medium. In one embodiment, the processor contains the emulation logic, whereas in other embodiments, the emulation logic exists outside of the processor and is provided by a third party. In one embodiment, the processor is capable of loading the emulation logic embodied in tangible form within non-transitory machine-readable media containing software by executing microcode or firmware contained in or associated with the processor.

Figure 13:
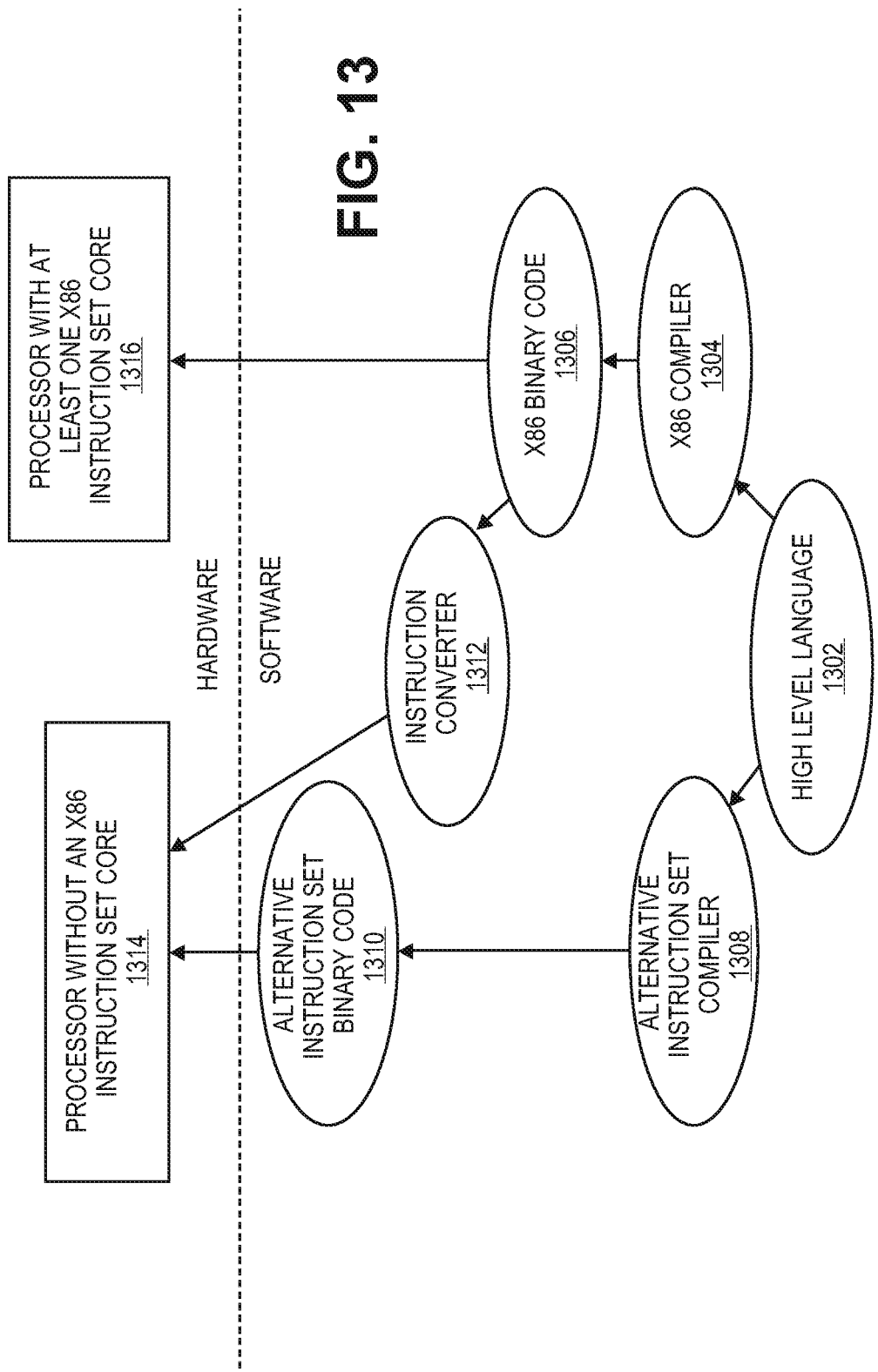
FIG. 13 illustrates a system to translate instructions according to one embodiment.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as a Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1312 is used to convert the x86 binary code 1306 into code that may be natively executed by the processor without an x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

Embodiments described herein enhance existing reliability, availability, and serviceability technologies by adding an additional cache memory to the memory controller of a processor device. In one embodiment this additional cache memory is configured as a faulty address buffer (FAB), which can be used to keep a record of addresses where a failure has occurred within near memory. The cache can then be used to filter out bad locations for future accesses, such that an access to far memory location that is aliased to a faulty location in near memory can be re-routed to far memory, bypassing the faulty cache location in near memory. While an access to a far memory location aliased to a faulty near memory cache line may result in a slight increase in access latency for that particular memory access, the overall system becomes significantly more stable, which is crucial for high availability systems. Without such mechanisms, small memory errors in near memory can be magnified into a large number of apparent memory system errors, reducing system availability.

The techniques described herein can be used independently of any other recovery or reliability systems, such as sparing, or can be used in tandem with such system to further enhance availability of systems incorporating multi-level main memory systems.

Figure 14:
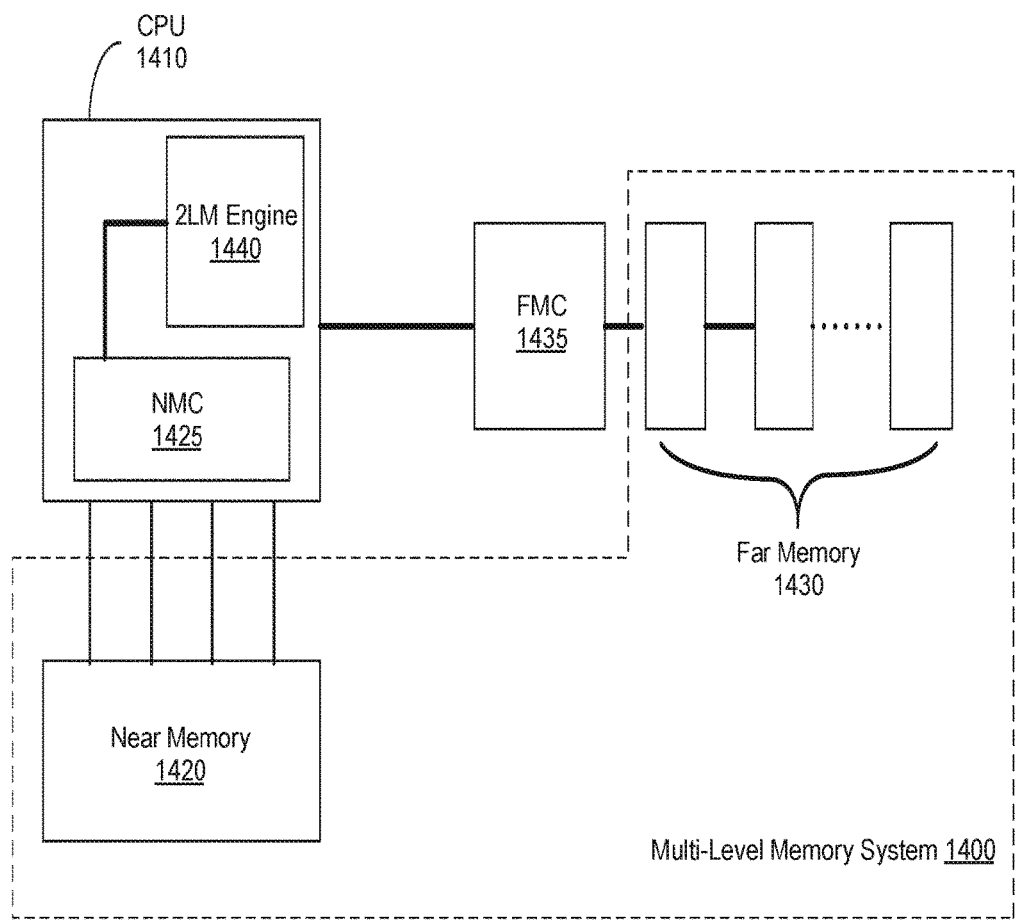
FIG. 14 illustrates a multi-level memory system, according to an embodiment.

FIG. 14 illustrates a multi-level memory system 1400, according to an embodiment. The illustrated multi-level memory system 1400 is a two level memory (2LM) system in which a first level of lower capacity and higher speed memory (e.g., near memory 1420) is used to cache a relatively higher capacity and lower speed memory (e.g., far memory 1430). The near memory 1420, which is the lower capacity, higher speed memory, can be volatile memory, such as DRAM memory, or any type of memory having sufficiently higher performance relative to the far memory 1430 which, based on the various types of memory and storage technologies available, can be a sufficiently fast non-volatile memory. While not explicitly required, in one embodiment the near memory 1420 is physically or logically located more adjacent to a processor (e.g., CPU 1410) relative to the far memory 1430. However, the terms 'near' and 'far' is generally descriptive of the access latencies and/or bandwidth capability associated with the memories.

The far memory 1430, which is the higher capacity and lower speed memory can be any non-volatile memory, such as, for example, a NAND flash memory. The far memory 1430 may also use non-flash based non-volatile memory technologies such as 3D XPoint, Resistive RAM, conductive-bridging RAM, phase change memory (PCM), or other memory technologies that may be used in an non-volatile dual in-line memory module (NVDIMM). In some embodiments the far memory 1430 additionally includes a portion of volatile memory that operates in conjunction with non-volatile memory. The volatile memory within the far memory 1430 can be configured as a buffer or cache for data to be transmitted or received from the near memory 1420.

The multi-level memory system 1400 stores instructions and data for runtime access by a CPU 1410. The CPU 1410 can manage the near memory 1420 via a near memory controller (NMC) 1425 and the far memory 1430 via a far memory controller (FMC) 1435, which, in one embodiment, is separate from the NMC 1425. The FMC 1435 reports the far memory 1430 to the system OS as main memory, such that the system OS recognizes the size of far memory 1430 as the size of multi-level memory system 1400. In one embodiment the near memory 1420 is a transparent cache of the far memory 1430 and the system OS and system applications are "unaware" of the existence of near memory 1420.

In one embodiment the CPU 1410 comprises a 2LM engine 1440 that includes hardware and/or software logic to support the illustrated two-level main memory 1400. In one embodiment, the CPU 1410 includes micro-code extensions or other hardware logic that enables the CPU 1410 to manage memory accesses (e.g., loads, stores, etc.) to the multi-level memory system 1400. The 2LM engine 1440 can maintain a full tag table that tracks the status of all architecturally visible elements of far memory 1430. When the CPU 1410 attempts to access a specific data segment in the multi-level memory system 1400, the 2LM engine 1440 can determine whether the specific data segment is included in near memory 1420; if it is not, 2LM engine 1440 fetches the data segment in far memory 1430 and subsequently writes the data segment to near memory 1420 in a manner similar to a cache miss. It is to be understood that, because near memory 1420 acts as a cache of far memory 1430, the 2LM engine 1440 may further execute data prefetching or similar cache efficiency processes known in the art.

In one embodiment the 2LM engine 1440, NMC 1420, and FMC 1435 can be combined within or collectively function as a 2LM memory controller that enables the CPU 1410 to access to the multi-level memory system 1400. Such 2LM memory controller can abstract various aspects of the multi-level memory system 1400 from the processor such that the processor is not required to have full knowledge of the specific operational details of the multi-level memory system 1400.

The 2LM engine 1440 may manage other aspects of far memory 1430. For example, in embodiments where far memory 1430 includes flash-based nonvolatile memory, the 2LM engine 1440 can execute functions including wear-leveling or other flash memory maintenance operations in a manner transparent to system software. For example, executing wear-leveling functions may include selecting segments from a free pool of clean unmapped segments in far memory 1430 that have a relatively low erase cycle count.

Figure 15:
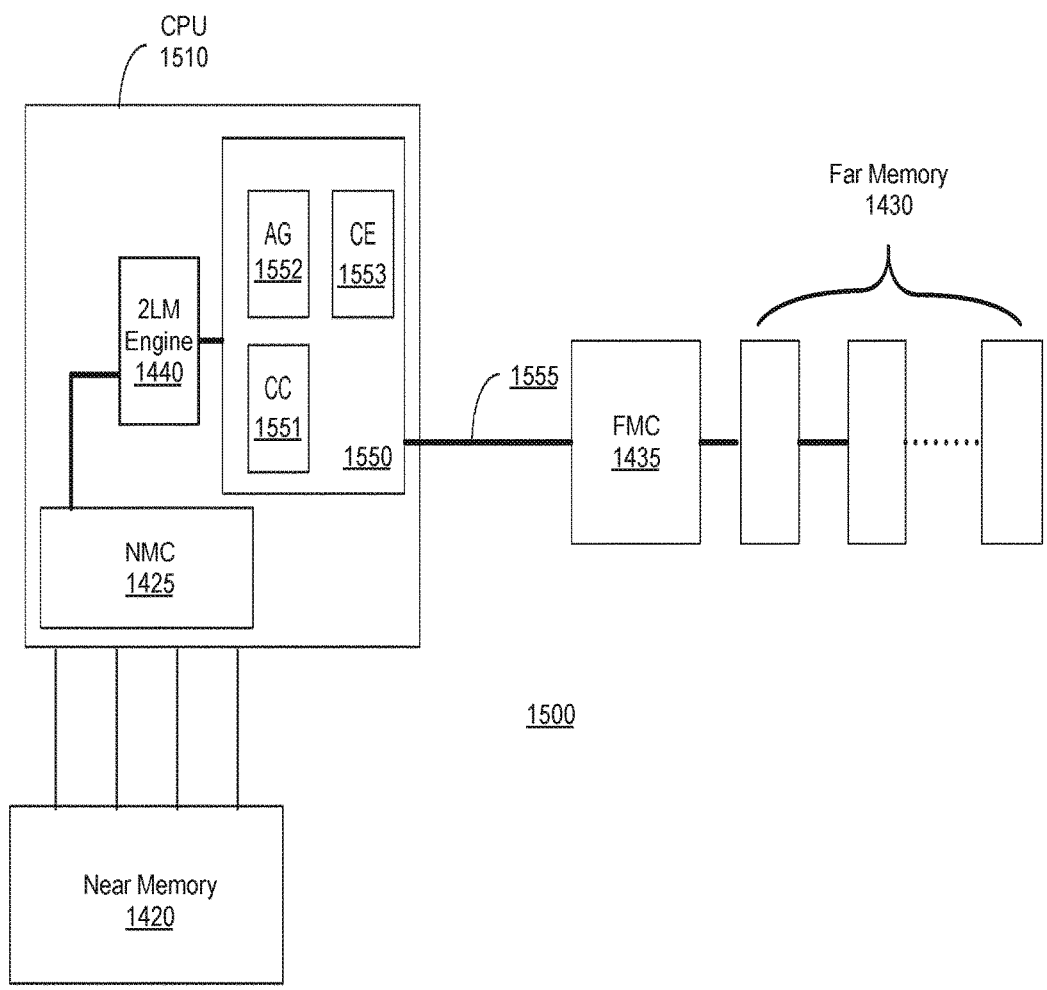
FIG. 15 is a block diagram of an additional system including multi-level main memory, according to an embodiment

FIG. 15 is a block diagram of an additional system 1500 including multi-level main memory, according to an embodiment. In the illustrated embodiment, the 2LM architecture described in FIG. 14 is expanded to enable compression to the data transmitted to and from the far memory 1430. Computational workloads vary in their cache friendliness, such that some workloads generate a higher cache miss-rate relative to other workloads. When executing such workload, performance may not improve with increasing cache size. Thus, under some circumstances, the performance of the system 1500 may depend, in part, on the bandwidth capacity between near memory 1420 and far memory 1430. Thus, compressing data transmitted between near memory 1420 and far memory 1430 can preserve transmission bandwidth between the memories and increase overall performance when executing workloads that cause high miss rates in the near memory 1420.

In one embodiment, the near-to-far memory transfer path is controlled at least in part by a port control module 1550. The port control module 1550 includes sub-modules to accommodate the resulting changes in data size created by the compression and decompression operations in the transfer process. In one embodiment the port control module 1550 includes hardware compression and decompression engine (CE) 1553, compression control block (CC) 1551 and address generation block (AG) 1552. The CE 1553 may utilize any compression method known in the art and suitable for the intended use of the system 1500. The port control module 1550 can also enable a messaging scheme between the CC 1551 and the FMC 1435.

The CE 1553 can process a data payload moving between near memory 1420 and far memory 1430 across an I/O interface 1555. In one embodiment, multiple instances of the FMC 1435 may be present, which can each share a single instance of the CE 1553. In one embodiment, multiple instance of the CE 1553 are implemented to support system implementations with multiple instances of the FMC 1425, such that an instance of the CE 1553 can be present for each instance of the I/O interface 1555 to the FMC 1425.

In one embodiment, far memory 1430 stores data in compressed form and near memory 1420 includes the corresponding uncompressed version. Thus, when near memory 1420 request contents of far memory 1430, FMC 235 retrieves said contents and returns it across I/O interface 255 in fixed payload sizes tailored to match the compression algorithm in use. The CE 253 may then decompress the data and each accumulated cache line may be transferred in sequence to near memory 1420 via the NMC 225.

In one embodiment, initialization of AG 1552 may be accomplished either by vendor-specific extensions to the header accompanying payloads from the FMC 1425, or by a preamble vendor-defined message (VDM) issued by the FMC 1425 prior to the first payload transfer. In one embodiment, AG 1552 is initialized to the first of the sequential near memory cache line addresses at the onset of a transfer, and generates sequential addresses until the transfer is complete. Thus, compression employed between the port control module 1550 and the FMC 1435 may be transparent to the NMC 1425. In the event FMC 1435 requests data from near memory 1420, the FMC 1435 may issue a transfer request to CC 1551, which may further initialize AG 1552 to pull the target cache lines sequentially from the near memory 1420. The CE 1553 may then pack the pulled cache lines into compressed fixed payloads that are then issued to FMC 1435, in order, until the transfer is complete. In one embodiment, the CC 1551 initializes the AG 1552 with a destination address in the FMC 1435 to receive the compressed payloads and the AG automatically generates subsequent FMC target addresses until the entire data segment has been transferred. For example, the FMC 1435 may issue a VDM to request the transfer from the CC 1551 and stipulate both the target data segment of near memory 1420, and destination in far memory 1430. In one embodiment, the FMC 1435 detects when compression is present and enabled, and requests data as described above (rather than to pull the target data segment directly from near memory 1420 if compression is not present or enabled).

In embodiments in which the 2LM engine 1440 utilizes a tag table to determine which data segments are included in near memory 1420, the system 1500 can determine which far memory address blocks correspond to which compressed data segments in the address map utilized by the tag table. In one embodiment, this is accomplished by extending the semantics of the "transfer complete" messaging between FMC 1435 and 2LM engine 1440. On data transfers to far memory 1430, the FMC 1435 completion is routed through the CE 1553, which reports how many blocks were actually updated. The CPU 1510 may then return unused blocks to a free list structures for later use.

A multi-level memory system can be implemented in which DRAM provides a first level of the memory system and one or more non-volatile memory technologies can provide one or more levels (e.g., secondary, tertiary, etc.) of memory. It is generally understood that DRAM may be subject to a non-zero incidence of "soft errors" resulting in corruption of data, such that data retrieved from an affected DRAM location does not match the expected data stored to that location. Soft errors can occur due to a mistake in design or manufacturing but can also occur in properly designed and manufactured devices due to external factors, such as cosmic rays or electro-magnetic interference. Many systems implement an error correction code (ECC) algorithm to mitigate the effects of the soft error rate (SER), as well as other well-known effects that may result in corruption of data stored to DRAM. The robustness of the ECC algorithm employed in these systems directly impacts the reliability of the system.

However, any DRAM subsystem protected by an ECC algorithm still has a non-zero probability of experiencing a detectable, uncorrectable error (DUE), which is an error that is detected by the ECC algorithm but cannot be corrected for example, a multi-bit error preventing the data from being restored.

To remedy system errors that can occur as a result of a DUE, several reliability, availability, and serviceability (RAS) technologies can be implemented to improve data integrity and system resilience for mission-critical computing environments. One such technology is Machine Check Recovery (e.g., MCA Recovery), which is a hardware technology that can enable a host OS or VMM to enable automatic recovery from certain otherwise uncorrectable errors that would otherwise result in a system crash or failure.

Figure 16:
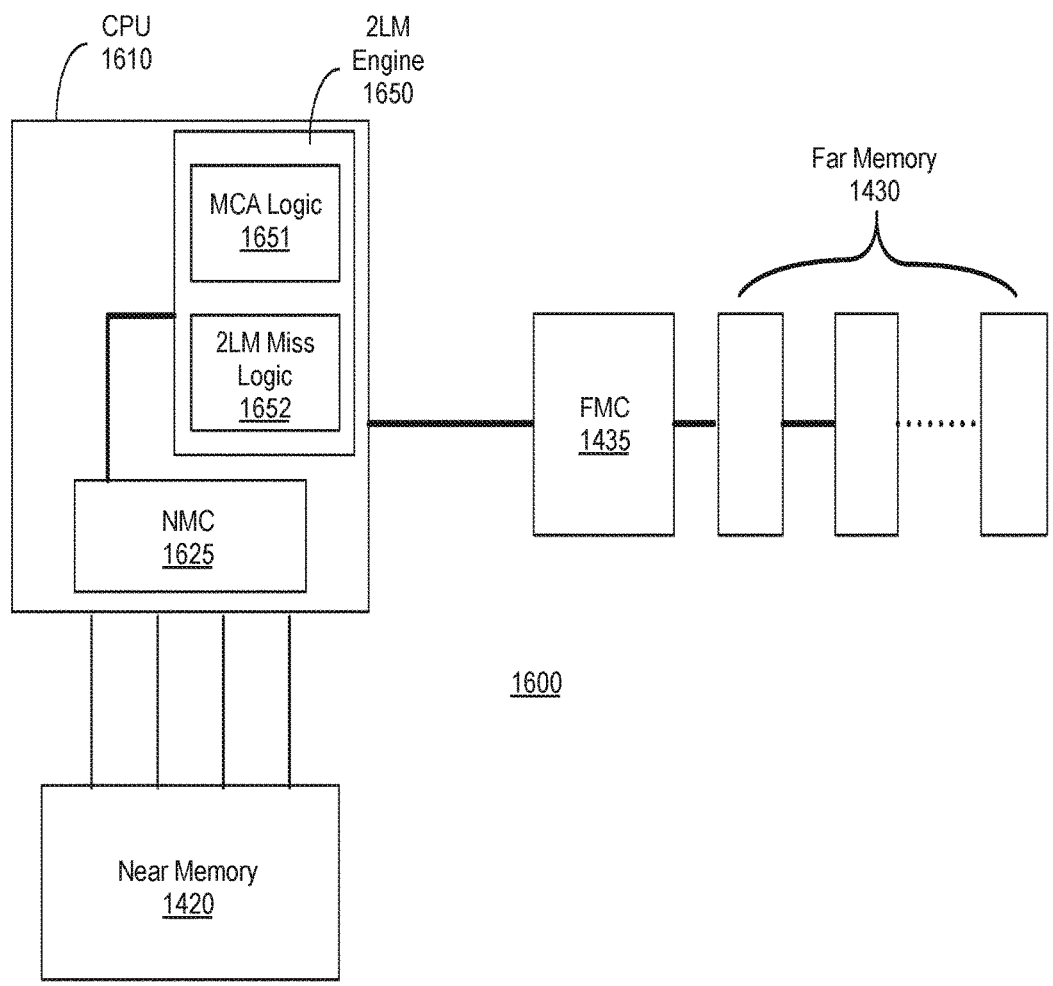
FIG. 16 is a block diagram of a multi-level memory system configured to reduce DUE incidence.

FIG. 16 is a block diagram of a multi-level memory system 1600 configured to reduce DUE incidence. The multi-level memory system 1600 is associated with a CPU 1610 including a 2LM engine 1650 and an NMC 1625. The NMC 1625 can include logic to support near memory 1420 including ECC DRAM. While an ECC algorithm protects the contents of near memory 1420, the system 1600 can provide a layer of reliability above that provided by current ECC solutions via the use of Machine Check Recovery logic 1651 within the 2LM engine 1650. A DUE in a data segment included in near memory 1420 may be detected by an NMC 1625 and the presence of the DUE can be signaled to the 2LM engine 1650.

Upon detection of a DUE in the near memory, the 2LM engine can then determine whether the data segment has been modified in the near memory 1420. (e.g., if the data segment is dirty). In the case where the associated data segment is clean (e.g., not dirty), the 2LM engine 1650 can execute 2LM miss logic 1652 to re-fetch the (presumably uncorrupted) far memory copy of the data back into near memory 1420 as if the DRAM access had in fact "missed" the near memory cache, and subsequently allow CPU 1610 to access near memory 1420 as if the DUE had never occurred. However, in cases where the data segment in near memory 1420 is in fact dirty, or in the case that associated data segment in far memory 1430 is determined by the FMC 1435 to also be corrupt or invalid, the DUE is unrecoverable by hardware and is reported as an uncorrectable error.

Due to the design of certain multi-level memory systems, some error conditions can cause a multi-level memory system to appear significantly less reliable than a single level memory system. For example, a multi-level memory system can be configured with cache line aliasing, such that a single cache line in near memory 1420 is mapped to multiple addresses in far memory 1430. In such configuration, the memory system may detect an error for each of the multiple addresses in far memory, even though the error lies only within a single area of near memory.

Figure 17:
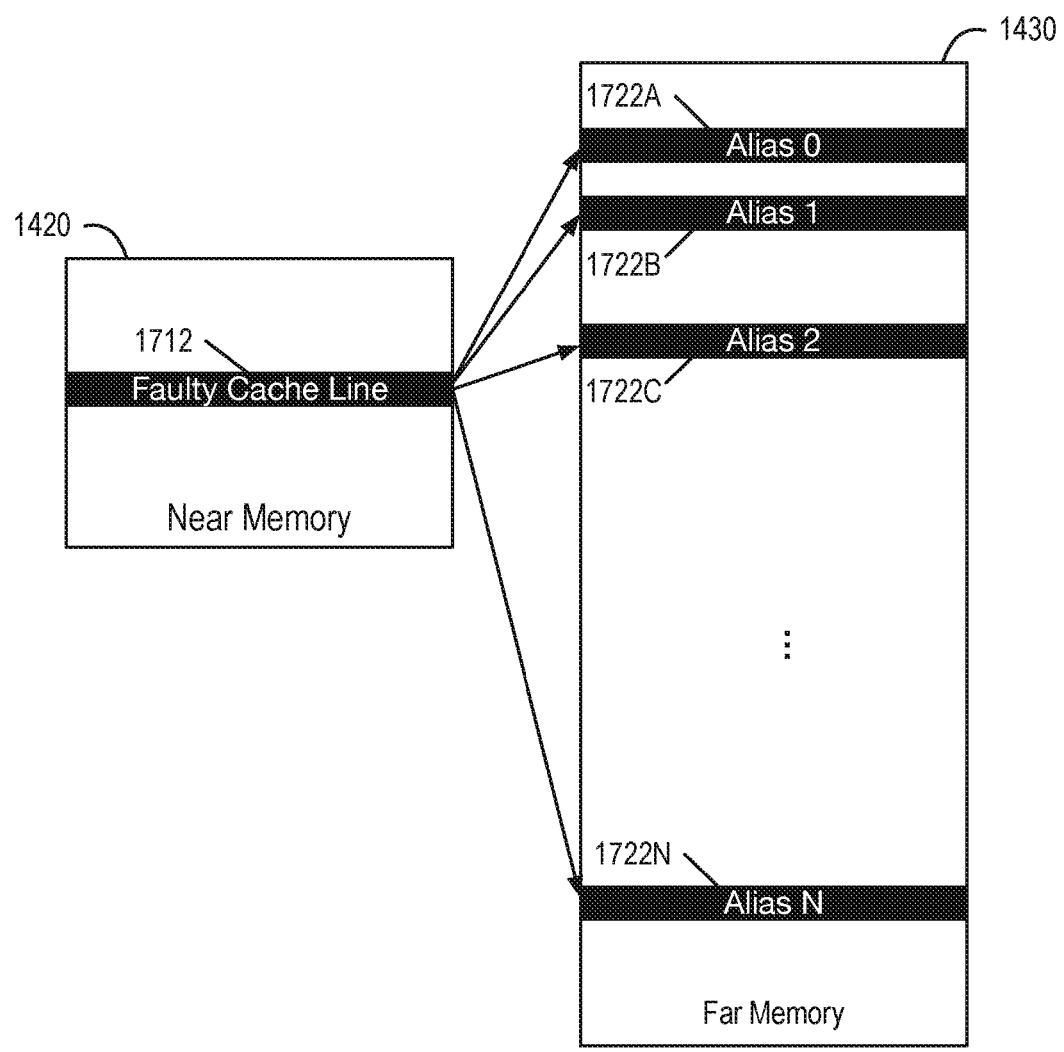
FIG. 17 illustrates cache line aliasing in a multi-level memory system.

FIG. 17 illustrates cache line aliasing in a multi-level memory system 1700. The illustrated multi-level memory system 1700 is based on a two level memory system as described in FIGS. 14-16, in which a first level of lower capacity and higher speed memory (e.g., near memory 1420) is used to cache a relatively higher capacity and lower speed memory (e.g., far memory 1430). In the illustrated multi-level memory system 1400, the near memory 1420 is divided into multiple cache lines, where each cache line in the near memory 1420 is mapped (e.g., aliased) to multiple locations. In various embodiments, each cache line in near memory 1420 can map to as many as to two hundred and fifty six (256) locations in far memory 1430, although the precise number of mappings can vary.

The nature of the caching arrangement is transparent, such that the far memory 1430 is presented to the operating system as system memory, with the near memory 1420 acting as a transparent caching system that is managed by a collection of memory controllers and/or logic executing on a host CPU. When the operating system attempts to access a memory address in the far memory 1430 and the data is retrieved and cached in near memory 1420. However, should a fault develop in the underlying physical memory associated with any given cache line in near memory 1420, all locations in far memory 1430 that are mapped to the given cache line will also appear faulty. Thus, any access to an address that is aliased to a faulty cache line will cause a system error. For example, for a single fault cache line 1712 in the near memory 1420, an access to any number of alias addresses 1722A, 1722B, 1722C, through 1722N (e.g., Alias 0-Alias N) will cause a memory access fault. Even if MCA recovery or an equivalent feature is enabled, the system will appear as though numerous memory faults are present, even though the multiple faults are caused by a single error in the faulty cache line 1712 of near memory 1420.

One mitigation approach for these type of errors is to utilize memory sparing, in which one or more additional banks of memory are present in the system as spares. If the system should detect an inordinate number of corrected errors within a specific memory device, the system can perform a sparing operation to replace the faulty or failing memory device with one of the spares. This failure prediction assumes a failure scenario in which a pattern of corrected errors occurs before an uncorrected error, allowing the system the opportunity to perform the sparing operating before an uncorrected error occurs. However, once the spare memory devices are enabled, subsequent errors may result a system failure.

Figure 18:
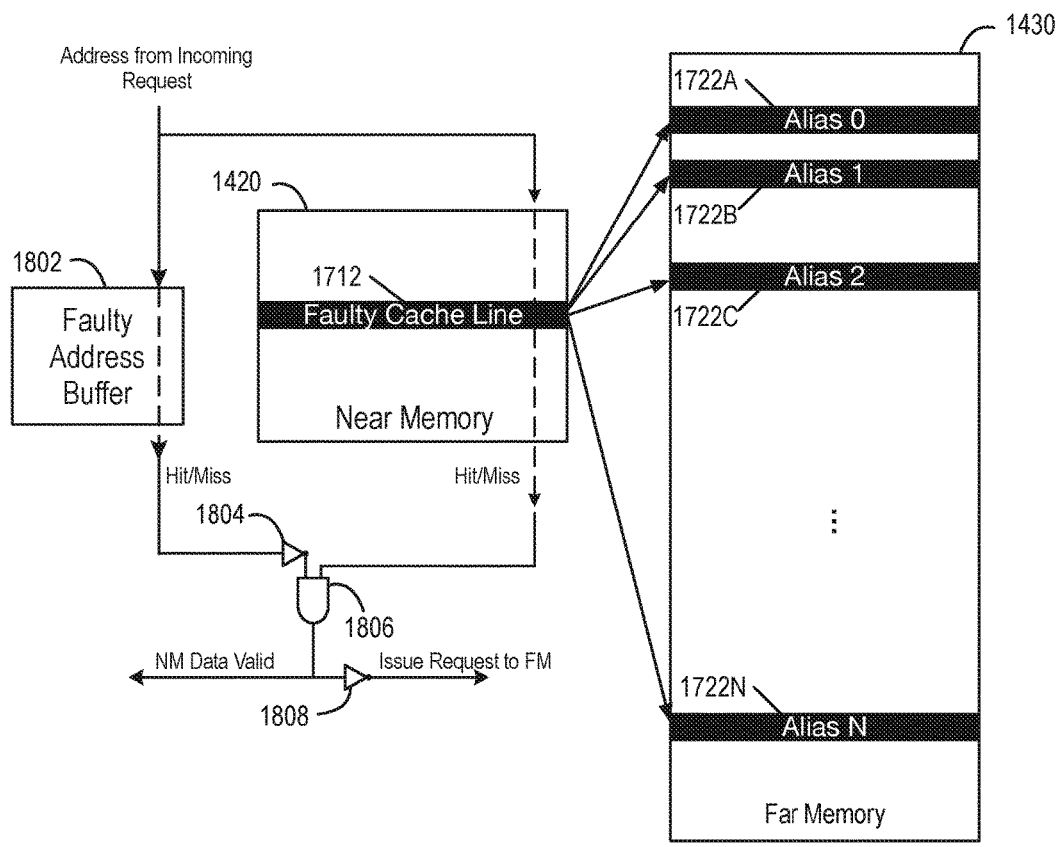
FIG. 18 illustrates logic within a high availability multi-level memory system, according to an embodiment.

FIG. 18 illustrates logic within a high availability multi-level memory system 1800, according to an embodiment. The high availability multi-level memory system 1800 is based on any of the multi-level memory systems of FIGS. 14-16 and uses the cache line aliasing illustrated in FIG. 17, in which a faulty cache line 1712 in near memory 1420 can appear as a memory failure for each aliased address 1722A-1722N in far memory 1430. To address this issue, one embodiment provides for an additional cache memory within a processor memory controller to store a faulty address buffer (FAB) 1802. The FAB 1802 can keep track of addresses that have been marked as faulty within the near memory 1420. All read or write accesses to memory can access the FAB 1802 to determine whether an address has been marked as faulty.

To avoid a performance impact, the lookup to the FAB 1802 can be performed in parallel with the lookup to near memory 1420. For example and in one embodiment, the output signal associated with a lookup to the FAB 1802 can be connected to an AND gate 1806 via a first inverter 1804, such that a hit or miss result is negated upon input to the AND gate 1806. An output signal associated with a lookup to the near memory 1420 can also be connected to the AND gate 1806. A second inverter 1808 can be connected to the output of the AND gate 1806, such that a signal indicating whether to perform the lookup from near memory 1420 will always be the inverse of the signal indicating whether to perform the lookup from far memory 1430. In one embodiment the near memory cache is transparent, so the address from the incoming request is provided as a result of a memory translation from a far memory address to a near memory address by a memory controller of the processor.

Operation of the system 1800 can proceed as follows. A miss in the near memory 1420 causes the memory controller to automatically satisfy the access request from the far memory 1430. If the FAB 1802 returns a hit, suggesting that the address in question has been previously marked as a bad address, the lookup to near memory 1420 is forced to a miss via the AND gate 1806, even if the lookup to near memory 1420 is a hit. In such case, the request is then issued to far memory 1430. If the FAB 1802 returns a miss, then the requested address is not present in the faulty address list and the result is determined based on the result of the lookup to near memory 1420. For example, the lookup to near memory 1420 returns a hit and the result of the lookup to the FAB 1802 is a miss, then the incoming request can be satisfied from near memory 1420. If the lookup to the near memory 1420 is a miss, then the request will be satisfied from the far memory 1430, without regard to the result of the lookup in the FAB 1802. A list of input and associated output is shown in Table 1 below.

TABLE 1

| Memory Lookup Result | | |
|---|---|---|
| FAB | Near Memory Lookup | Result |
| Miss | Miss | Satisfy Request from Far Memory |
| Miss | Hit | Satisfy Request from Near Memory |
| Hit | Miss | Satisfy Request from Far Memory |
| Hit | Hit | Satisfy Request from Far Memory |

As shown in Table 1, a memory lookup will be satisfied from near memory 1420 when data is present in near memory 1420 and the requested address is not listed in the FAB 1802. By using the method described herein, the availability of the system can be significantly enhanced and the error magnification that can occur due to errors in near memory 1420 can be avoided.

Various policies may be applied to add failing or failed addresses to the FAB. In one embodiment, addresses in near memory 1420 are added to the FAB 1802 in response to detection of an uncorrectable error (e.g., a DUE) at a given address. For example, if a DUE causes a recoverable system fault, the memory controller can add the address that caused the DUE to the FAB 1802. In the event that the DUE causes an unrecoverable error, the system will maintain an error state that lists the address that caused the DUE and, after a system reset, the address that caused the DUE can be added to the FAB 1802.

In some embodiments it is not necessary to wait for an uncorrected error occurs. For example, in one embodiment system firmware, such as BIOS code or another managing agent, can observe a corrected error rate for certain addresses. Once a corrected error rate above a threshold has been detected for an address, the firmware can program the FAB 1802 with the address, enabling a predictive failure avoidance mechanism. In one embodiment, such technique can be extended to allowing system firmware to save and restore the contents of the FAB 1802 on reboot so that the system will not have to re-learn the set of faulty addresses in near memory 1420 upon system restart. The failed address tracking capability can be configured to work in conjunction with other reliability, availability, and serviceability technologies. For example and in one embodiment, firmware can be configured to first implement a policy to enable sparing functionality and if additional failures are detected after the sparing, the addresses associated with the failures can be added to the FAB 1802.

Figure 19:
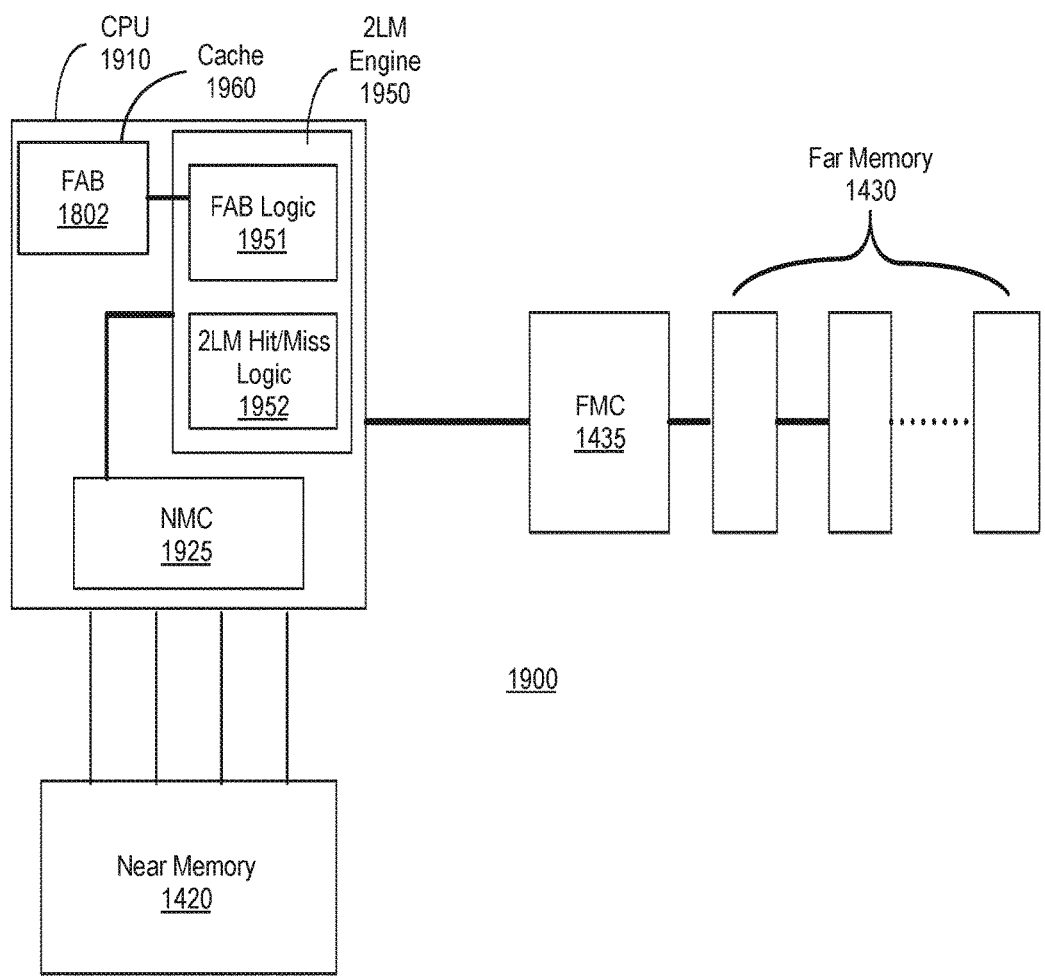
FIG. 19 is a block diagram of a high availability multi-level memory system, according to an embodiment.

FIG. 19 is a block diagram of a high availability multi-level memory system 1900, according to an embodiment. In one embodiment the high availability multi-level memory system 1900 includes logic illustrated in the system 1800 of FIG. 18. In the illustrated system 1900, the FMC 1435 and far memory 1430 can be configured as generally described herein.

In one embodiment, the memory system 1900 includes a CPU 1910 having a cache memory 1960 configured to store an FAB 1802 having a list of fault addresses in near memory 1420 associated with an uncorrectable error or a series of correctable errors. The cache memory 1960 can be any cache memory described herein. In one embodiment the cache memory 1960 is a separate, dedicated cache memory configured to store data for use in the operation of the multi-level memory system 1900. A near memory controller 1925 can work in conjunction with a 2LM engine 1950 having FAB logic 1951 and 2LM hit/miss logic 1952. The FAB logic 1951 can include hardware, firmware, or micro-code logic to perform operations similar to the logic gates of FIG. 18 (e.g., AND gate 1806, first inverter 1804, second inverter 1808). The 2LM hit/miss logic 1952 can be similar to the 2LM miss logic 1652 of FIG. 16, with modifications to work with the FAB logic 1951 in the manner described with respect to FIG. 18. For example, the 2LM Hit/Miss logic 1952 can be configured to handle a 2LM hit as a 2LM miss in response to operations of the FAB logic 1951. In one embodiment, the combined functionality of the 2LM engine 1950, NMC 1925, and the FMC 1435 can be combined within a logical or physical 2LM memory controller that can provide abstracted access to the near memory 1420 and the far memory 1430, such that processes or threads executing the CPU will not require knowledge of the specific details of the main memory system.

Figure 20:
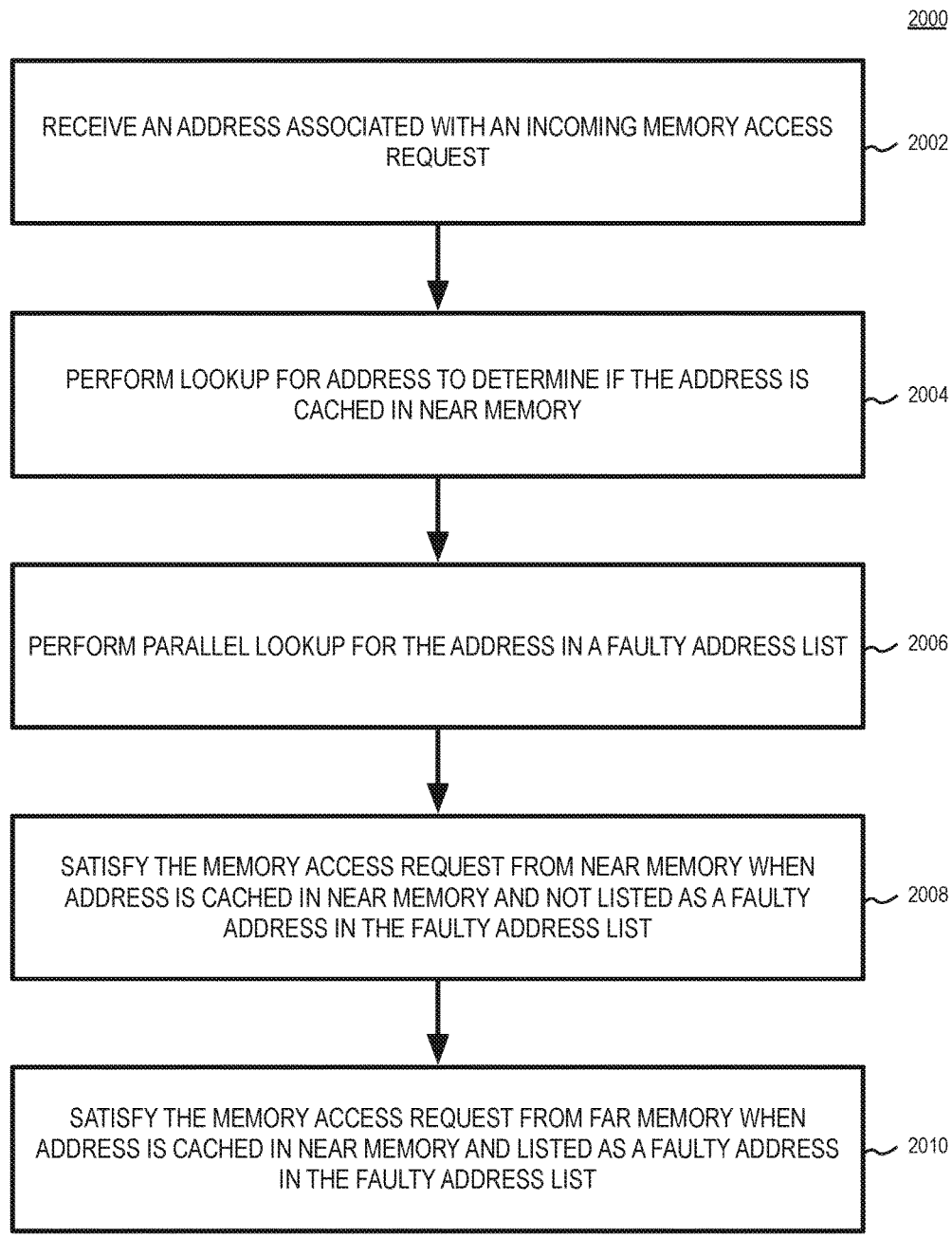
FIG. 20 is a flow diagram illustrating operations for memory control logic for a high availability multi-level memory system, according to an embodiment.

FIG. 20 is a flow diagram illustrating operations for memory control logic 2000 for a high availability multi-level memory system, according to an embodiment. The logic operations can be performed, in one embodiment, by logic within a CPU or another processor configured to access a multi-level memory system, such as the FAB logic 1951 of the 2LM engine 1950 as in FIG. 19. The logic can operate in conjunction with a cache memory storing a faulty address buffer (FAB), such as, for example, the FAB 1802 as in FIGS. 18-19.

As shown at 2002, the memory control logic 2000 can receive an address associated with an incoming memory access request. The address can be a system address that is associated with (e.g., mapped to) an address in near memory. In one embodiment, using a tag table of a 2LM engine, the memory control logic 2000 can perform a lookup for the address to determine if the address is cached in near memory, as shown at 2004. In parallel with the near memory lookup, the memory control logic 2000 can perform a lookup for the address in a faulty address list at 2006 to determine if the address has been marked as a faulty address. The faulty address list can be stored in a faulty address buffer which, in one embodiment is stored in a cache memory associated with the memory control logic 2000. As shown at 2008, the memory control logic 2000 will satisfy the memory access request from near memory when the address is cached in near memory and not listed as a faulty address in the faulty address list. As shown at 2010, the memory control logic 2000 will satisfy the memory access request from far memory, even when the address is cached in near memory, if the address is listed as a faulty address in the faulty address list. In one embodiment, satisfying the memory access request from the far memory includes caching or buffering the data in the far memory in a volatile memory included within the far memory and transmitting the data from the volatile memory in the second memory level. The data can be transmitted to the first memory level and/or to a cache memory within a processor.

Figure 21:
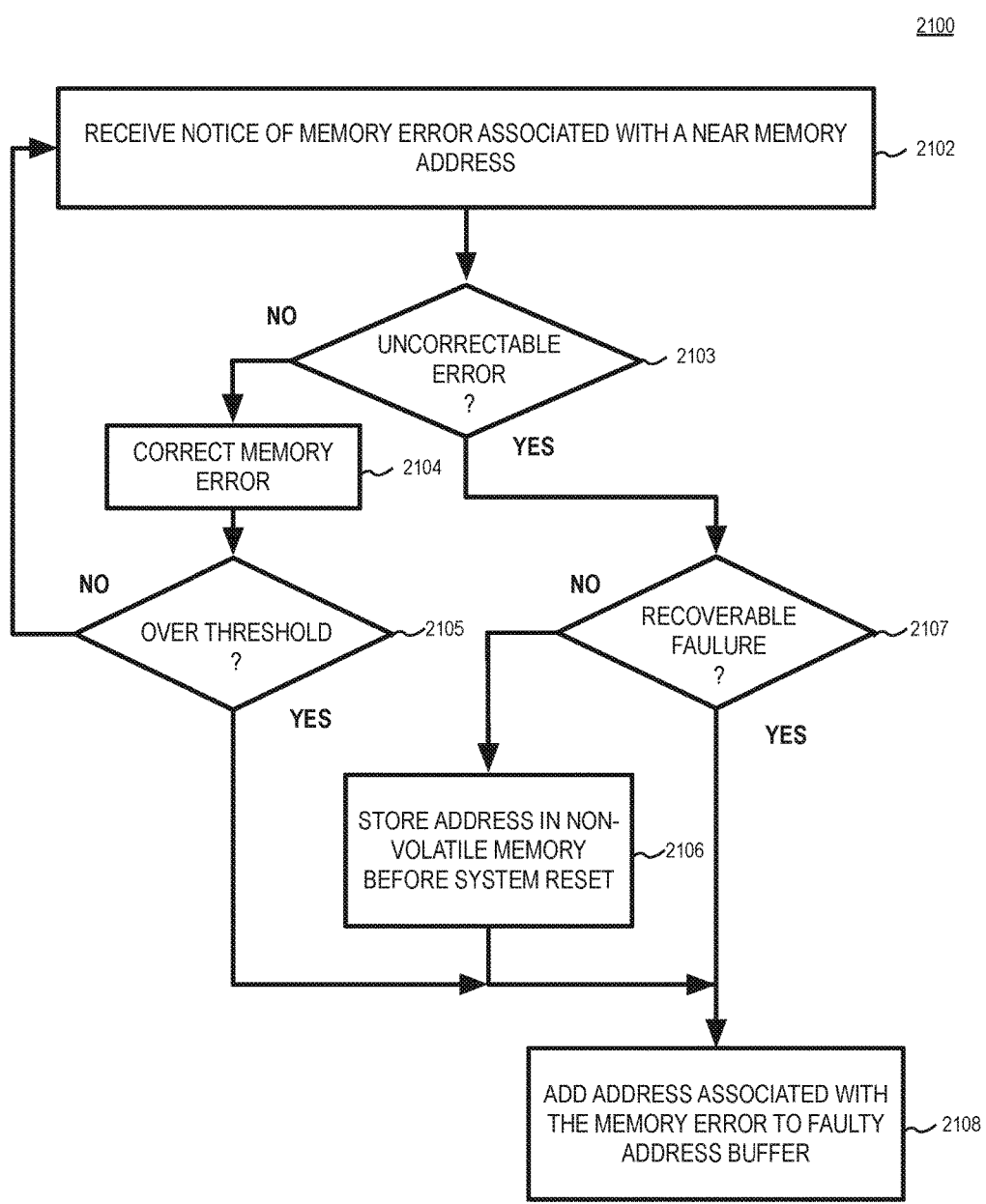
FIG. 21 is a flow diagram illustrating operations for memory control logic to add an address to a faulty address buffer, according to an embodiment

FIG. 21 is a flow diagram illustrating operations for memory control logic 2100 to add an address to a faulty address buffer, according to an embodiment. In one embodiment the memory control logic can be performed in parallel with the memory control logic 2000 of FIG. 20 and can be enabled by hardware, firmware, or micro-code logic within a processor. For example, the memory control logic 2100 can be performed by the FAB logic 1951 of the 2LM engine 1950 as in FIG. 19.

In one embodiment the memory control logic 2100 can receive a notice of memory error associated with a near memory address 2102. The notice can list the address in which the memory error occurred. The address listed in the notice can be one of several addresses, including a system address and/or a decoded memory address.

The memory control logic 2100 can determine at 2103 whether the error is an uncorrectable error (e.g., a detectable, uncorrectable error). If the error is a correctable error, ECC logic can be used to correct the memory error at 2104. The memory control logic 2100 can then determine at 2105 whether a number of correctable errors for the address, cache line, and/or memory device is over an expected corrected error rate threshold established for the memory system. If the number of correctable errors is less than the threshold, the error is likely a soft error that does not indicate a potential hardware failure. In such scenario, the memory control logic 2100 can perform no further operations related to the FAB until the memory control logic receives an additional notice of a memory error at 2102. However, if the number of correctable errors exceeds the correction threshold, it is possible that the faulting portion of the near memory has experienced or is about to experience a hard error. The memory control logic 2100 can then add the address associated with the memory error to the faulty address buffer 2108.

Returning to 2103, in the event the memory error is an uncorrectable error (e.g., a DUE), the memory control logic 2100 can determine if a system failure resulting from the DUE is a recoverable failure at 2107. A recoverable failure can be any failure in which a system restart is not required. For example, the operating system, via MCA recovery logic, can detect and recover from the DUE without requiring a system restart. Alternatively, the DUE may cause an application error or crash without causing a total system failure. In the event of a recoverable failure at 2107, the memory control logic 2100 can add the address associated with the memory error to the faulty address buffer at 2108. If the DUE causes a failure that is determined to not be recoverable at 2107, such that a controlled restart of the system is required, the memory control logic 2100, or firmware logic in communication with the memory control logic 2100, can store an address or addresses associated with the DUE in non-volatile memory, as illustrated at 2106. After system reset, the memory control logic 2100 can add the address associated with the memory error to the faulty address buffer at 2108. In general, the address or addresses added to the faulty address buffer at 2108, in various embodiments, can be the system address, near memory address, far memory address associated with the faulting near memory address, and/or an address or identifier associated with the near memory cache-line containing the faulting near memory address.

The non-volatile memory in which the faulting address or addresses is stored can be operating system visible non-volatile memory or firmware controlled non-volatile memory. In one embodiment, a small portion of non-volatile memory may be included within the processor to store such data. In one embodiment, the faulting address can be provided to a host operating system via MCA logic and the host operating system can store addresses associated with memory errors. In one embodiment the operations at 2106 can be extended to generally enable persistent storage of the entire faulty address buffer across system resets, or to enable a save of the faulty address buffer before system reset and a restore of the faulty address buffer after a system reset.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Embodiments are implemented as any one or a combination of: one or more microchips or integrated circuits interconnected using a parent-board, hardwired logic, software stored by a memory device and executed by a microprocessor, firmware, an application specific integrated circuit (ASIC), and/or a field programmable gate array (FPGA). The term "logic" may include, by way of example, hardware and/or combinations of software and hardware.

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Various components can be a means for performing the operations or functions described.

One embodiment provides for a memory system comprising a multi-level system memory including a first memory level of volatile memory and a second memory level that is larger and slower in comparison with the first memory level, the second memory level including non-volatile memory and a multi-level memory controller to enable access to the multi-level system memory and transfer data between the second memory level and the first memory level of the system memory, the multi-level memory controller including logic to manage a list of faulty addresses within the multi-level system memory. In one embodiment the first memory level includes cache to store a subset of the second memory level and each portion of the cache in the first memory level is aliased to multiple portions of the second memory level and the multi-level memory controller is to satisfy a request for data stored in the first memory level from the second memory level when the data is stored in an address on the list of faulty addresses.

One embodiment provides for a multi-level memory controller comprising a bus to communicatively couple the multi-level memory controller to a processor; first logic within the multi-level memory controller to determine if a data operand of a request received from the processor is stored in a first memory level of a main memory separate from the processor, wherein the first memory level of the main memory includes one or more Dynamic Random Access Memory (DRAM) devices and is to store a cached subset of a second memory level of the main memory, the second memory level being larger and slower in comparison with the first memory level; second logic within the multi-level memory controller to retrieve the data operand from the second memory level of the main memory, the second memory level including a non-volatile memory, in response to a determination that the requested data operand is not stored in the first memory level of the main memory; and third logic within the multi-level memory controller to cause the second logic to retrieve the data operand from the second memory level of the main memory in response to a determination that an address associated with the requested data operand is stored in a list of faulty addresses.

In one embodiment the third logic of the multi-level memory controller is to operate in parallel with the first logic and cause the second logic to retrieve the data operand from the second memory level of the main memory when the data operand of a request received from the processor is stored in a first memory level of a main memory and the address associated with the requested data operand is stored in a list of faulty addresses. The multi-level memory controller can be included in a processor package including the processor. In one embodiment the multi-level memory controller includes fourth logic to add an address to the list of faulty memory addresses. The fourth logic can add the address to the list of faulty memory addresses in response to a detected uncorrectable error associated with the address or in response to a detecting that a corrected error rate has exceeded an expected corrected error rate threshold. In one embodiment the second memory level additionally includes volatile memory.

One embodiment provides for a data processing system comprising a multi-level system memory including a first memory level of volatile memory and a second memory level that is larger and slower in comparison with the first memory level, the second memory level including non-volatile memory, wherein the first memory level includes cache to store a subset of the second memory level and each portion of the cache in the first memory level is aliased to multiple portions of the second memory level; a bus to communicatively couple the multi-level system memory to a processor; and a multi-level memory controller to enable the processor to access the multi-level system memory and transfer data between the second memory level and the first memory level of the system memory, the multi-level memory controller including logic to manage a list of faulty addresses within the multi-level system memory, wherein the multi-level memory controller is to satisfy a request for data stored in the first memory level from the second memory level when the data is stored in an address on the list of faulty addresses.

One embodiment provides for a method accessing a multi-level memory system including a first memory level and a second memory level, the method comprising receiving an address associated with a memory access request; performing a first lookup for the address to determine if the address is cached in the first memory level, the first memory level including one or more Dynamic Random Access Memory (DRAM) devices configured to store a cached subset of the second memory level, the second memory level being larger and slower in comparison with the near memory and including non-volatile memory; performing a second lookup in parallel with the first lookup to determine if the address is in a faulty address list; and satisfying the memory access request from the first memory level if the address is cached in the first memory level and not listed as a faulty address in the faulty address list.

One embodiment provides for a machine-readable medium having stored thereon data, which if performed by at least one machine, causes the at least one machine to fabricate at least one integrated circuit to perform a method as described herein.

Thus, techniques for performing one or more instructions according to at least one embodiment are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A memory system comprising:
    a multi-level system memory including a first memory level of volatile memory and a second memory level that is larger and slower in comparison with the first memory level, the second memory level including non-volatile memory; and
    a multi-level memory controller to enable access to the multi-level system memory and transfer data between the second memory level and the first memory level of the system memory, the multi-level memory controller including logic to manage a list of faulty addresses within the multi-level system memory;
    wherein the first memory level includes cache to store a subset of the second memory level and each portion of the cache in the first memory level is aliased to multiple portions of the second memory level; and
    wherein the multi-level memory controller is to
        perform a first lookup for the address to determine if the address is cached in the first memory level,
        perform a second lookup in parallel with the first lookup to determine if the address is in the list of faulty addresses,
        satisfy a request for data stored in the first memory level if the address is cached in the first memory level and the address is not listed in the list of faulty addresses, and
        satisfy a request for data stored in the first memory level from the second memory level when the data associated with the address is stored in the first memory level and the address is in the list of faulty addresses.

2. The memory system of claim 1, wherein the multi-level memory controller is to connect with a processor separate from the multi-level memory controller to enable the processor to access the multi-level system memory.

3. The memory system of claim 1, wherein the multi-level memory controller is integrated with a processor and is to enable the processor to access the multi-level system memory.

4. The memory system of claim 1, wherein a size of the second memory level is to be presented to an operating system (OS) as the size of the multi-level system main memory.

5. The memory system of claim 1, the second memory level additionally including volatile memory.

6. The memory system of claim 1, wherein the multi-level memory controller is to satisfy a request for a data segment stored in the multi-level system memory by translating a system address of the data segment to an address in the first memory level or the second memory level.

7. The memory system of claim 6, wherein the multi-level memory controller in response to a detected uncorrectable error is to replace at least a portion of the first memory level with a spare memory device.

8. The memory system of claim 6, wherein the multi-level memory controller, in response to a detected uncorrectable error is to add one or more addresses associated with the data segment to the list of faulty addresses.

9. The memory system of claim 6, wherein the multi-level memory controller is to:
    replace at least a portion of the first memory level with a spare memory device in response to a first detected uncorrectable error; and
    add one or more addresses associated with a second detected uncorrectable error to a list of faulty addresses.

10. The memory system of claim 1, wherein the multi-level memory controller is to add one or more addresses to the list of faulty addresses in response to detecting that a corrected error rate has exceeded an expected corrected error rate threshold.

11. A data processing system comprising:
    a multi-level system memory including a first memory level of volatile memory and a second memory level that is larger and slower in comparison with the first memory level, the second memory level including non-volatile memory, wherein the first memory level includes cache to store a subset of the second memory level and each portion of the cache in the first memory level is aliased to multiple portions of the second memory level;
    a bus to communicatively couple the multi-level system memory to a processor; and
    a multi-level memory controller to enable the processor to access the multi-level system memory and transfer data between the second memory level and the first memory level of the system memory, the multi-level memory controller including logic to manage a list of faulty addresses within the multi-level system memory, wherein the multi-level memory controller is to
        perform a first lookup for the address to determine if the address is cached in the first memory level,
        perform a second lookup in parallel with the first lookup to determine if the address is in the list of faulty addresses,
        satisfy a request for data stored in the first memory level if the address is cached in the first memory level and the address is not listed in the list of faulty addresses, and
        satisfy a request for data stored in the first memory level from the second memory level when the data associated with the address is stored in the first memory level and the address is in the list of faulty addresses.

12. The data processing system of claim 11, wherein the multi-level memory controller is included in a processor package including the processor.

13. The data processing system of claim 11, additionally comprising disk storage memory, wherein the second memory level is to include a cached subset of the disk storage memory.

14. The data processing system of claim 13, wherein the disk storage memory includes flash memory.

15. The data processing system of claim 11, wherein the multi-level system memory is a primary storage device for the data processing system.

16. The data processing system of claim 11, wherein the multi-level system memory is a primary system memory device for the data processing system.

17. The data processing system of claim 11, wherein the second memory level additionally includes volatile memory.

18. A method accessing a multi-level memory system including a first memory level and a second memory level, the method comprising:
    receiving an address associated with a memory access request;
    performing a first lookup for the address to determine if the address is cached in the first memory level, the first memory level including memory configured to store a cached subset of the second memory level, the second memory level being larger and slower in comparison with the first memory level and including non-volatile memory;

performing a second lookup in parallel with the first lookup to determine if the address is in a faulty address list; and satisfying the memory access request from the first memory level if the address is cached in the first memory level and not listed as a faulty address in the faulty address list; and satisfying the memory access request from the second memory level when data associated with the address is cached in the first memory level and the address is listed as a faulty address in the faulty address list.

19. The method of claim 18, wherein satisfying the memory access request from the second memory level includes:

caching or buffering the data in the second memory level in a volatile memory within the second memory level; and transmitting the data from the volatile memory within the second memory level.

* * * * *